[19] US 11,397,556 B2

(12) United States Patent
Arachchi

(10) Patent No.: US 11,397,556 B2
(45) Date of Patent: Jul. 26, 2022

(54) METHOD FOR SERVING RADIO COMMUNICATIONS TO USERS THROUGH MOBILE RADIOS

(71) Applicant: Tait International Limited, Christchurch (NZ)

(72) Inventor: Thilina Mallawa Arachchi, Christchurch (NZ)

(73) Assignee: Tait International Limited, Christchurch (NZ)

( * ) Notice: Subject to any disclaimer, the term of this patent is extended or adjusted under 35 U.S.C. 154(b) by 381 days.

(21) Appl. No.: 16/711,333

(22) Filed: Dec. 11, 2019

(65) Prior Publication Data

US 2020/0183642 A1 Jun. 11, 2020

Related U.S. Application Data

(60) Provisional application No. 62/778,238, filed on Dec. 11, 2018.

(51) Int. Cl.
*G06F 3/16* (2006.01)
*H04W 4/06* (2009.01)
*G06F 17/18* (2006.01)
*H04M 1/72418* (2021.01)

(52) U.S. Cl.
CPC .............. *G06F 3/165* (2013.01); *G06F 17/18* (2013.01); *H04M 1/72418* (2021.01); *H04W 4/06* (2013.01)

(58) Field of Classification Search
None
See application file for complete search history.

(56) References Cited

U.S. PATENT DOCUMENTS 9,883,413 B2 * 1/2018 Cama ..................... H04W 24/08
2019/0348041 A1 * 11/2019 Celia ....................... G10L 15/16

* cited by examiner

*Primary Examiner* — Quynh H Nguyen
(74) *Attorney, Agent, or Firm* — Run8 Patent Group, LLC; Peter Miller

(57) ABSTRACT

One variation of method includes, at a mobile radio: receiving an audio communication from an originating device over a wireless network at a first time; storing the audio communication in local memory; outputting the audio communication, at approximately the first time, at a first volume level set manually by a user associated with the mobile radio prior to the first time; calculating a confidence score that the audio communication was comprehended by the user based on the first volume setting; accessing a priority of the audio communication defined at the originating device; and, in response to a discrepancy between the confidence score and the priority of the audio communication, replaying the audio communication, from local memory, at a second volume setting greater than the first volume setting.

20 Claims, 6 Drawing Sheets

METHOD FOR SERVING RADIO COMMUNICATIONS TO USERS THROUGH MOBILE RADIOS

CROSS-REFERENCE TO RELATED APPLICATIONS

This Application claims the benefit of U.S. Provisional Application No. 62/778,238, filed on 11 Dec. 2018, which is incorporated in its entirety by this reference.

TECHNICAL FIELD

This invention relates generally to the field of radio communications and more specifically to a new and useful method for serving radio communications to users through mobile radios in the field of radio communications.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
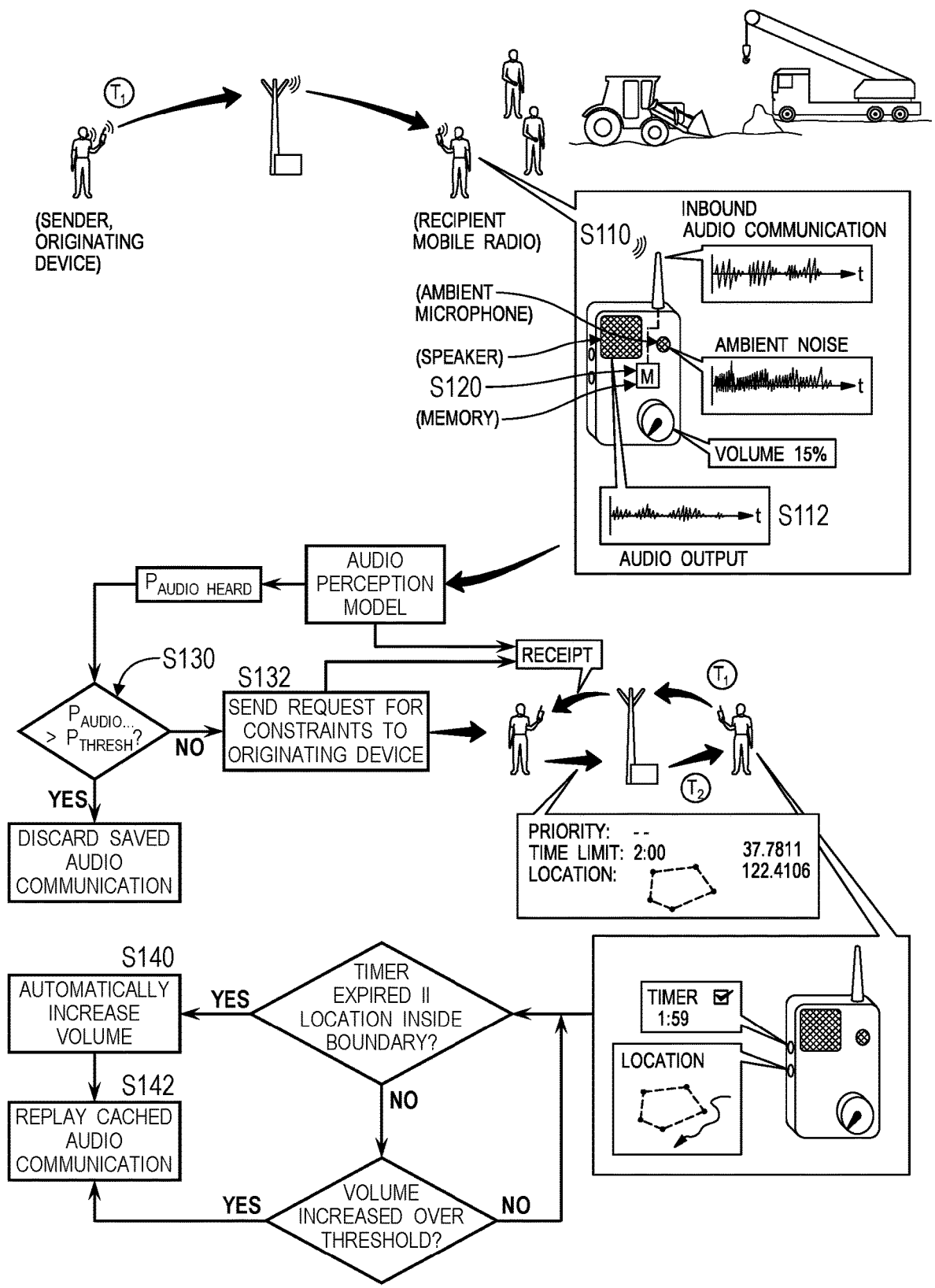
FIG. 1 is a flowchart representation of a method.

As shown in FIG. 1, a method S100 for serving radio communications to users through mobile radios includes, at a mobile radio: receiving an audio communication from an originating device over a wireless network at a first time in Block S110; storing the audio communication in local memory in Block S120; outputting the audio communication, at approximately the first time, at a first volume level set manually by a user associated with the mobile radio prior to the first time in Block S112; calculating a confidence score that the audio communication was comprehended by the user based on the first volume setting in Block S130; accessing a priority of the audio communication defined at the originating device in Block S132; and, in response to a discrepancy between the confidence score and the priority of the audio communication, replaying the audio communication, from local memory, at a second volume setting greater than the first volume setting in Block S142.

One variation of the method S100 includes: in response to predicting that the audio communication was unheard by a user, returning a request for a time constraint of the audio communication to the originating device in Block S132; in response to the user increasing the volume setting of the mobile radio over the threshold volume prior to conclusion of a time limit received from the originating device, replaying the audio communication from local memory in Block S142; and, in response to the volume setting of the mobile radio remaining below the threshold volume upon conclusion of the time limit, increasing the volume setting of the mobile radio over the threshold volume in Block S140 and replaying the audio communication from local memory in Block S142.

Another variation of the method S100 includes: in response to predicting that the audio communication was unheard by a user, returning a request for location constraint of the audio communication to the originating device in Block S132; and, in response to a location of the mobile radio intersecting a georeferenced boundary, received from the originating device, after the first time and prior to the volume setting of the mobile radio exceeding the threshold volume, increasing the volume setting of the mobile radio over the threshold volume in Block S140 and replaying the audio communication from local memory in Block S142.

A similar variation of the method S100 shown in FIGS. 2 and 3A-3D incudes: receiving an audio communication from an originating device over a wireless network at a first time in Block S110; storing the audio communication in local memory in Block S120; outputting the audio communication, at approximately the first time, at a first volume level set manually by a user associated with the mobile radio prior to the first time in Block S112; calculating a confidence score that the audio communication was comprehended by the user based on the first volume setting in Block S130; returning a first geolocation of the mobile radio at approximately the first time and the confidence score to the originating device in Block S134; and, based on a command from the originating device, replaying the audio communication, from local memory, at a second volume setting greater than the first volume setting at a second time succeeding the first time in Block S142.

Yet another variation of the method S100 includes: at an originating device, transmitting an audio communication to a mobile radio over a radio network at a first time; storing the audio communication in memory; receiving a receipt for the audio communication from the mobile radio; and, in response to the receipt excluding confirmation that a user associated with the mobile radio heard the audio communication, transmitting a command to the mobile radio to increase the volume setting of the mobile radio and resending the audio communication, from memory, to the mobile radio for playback to the user.

Figure 5:
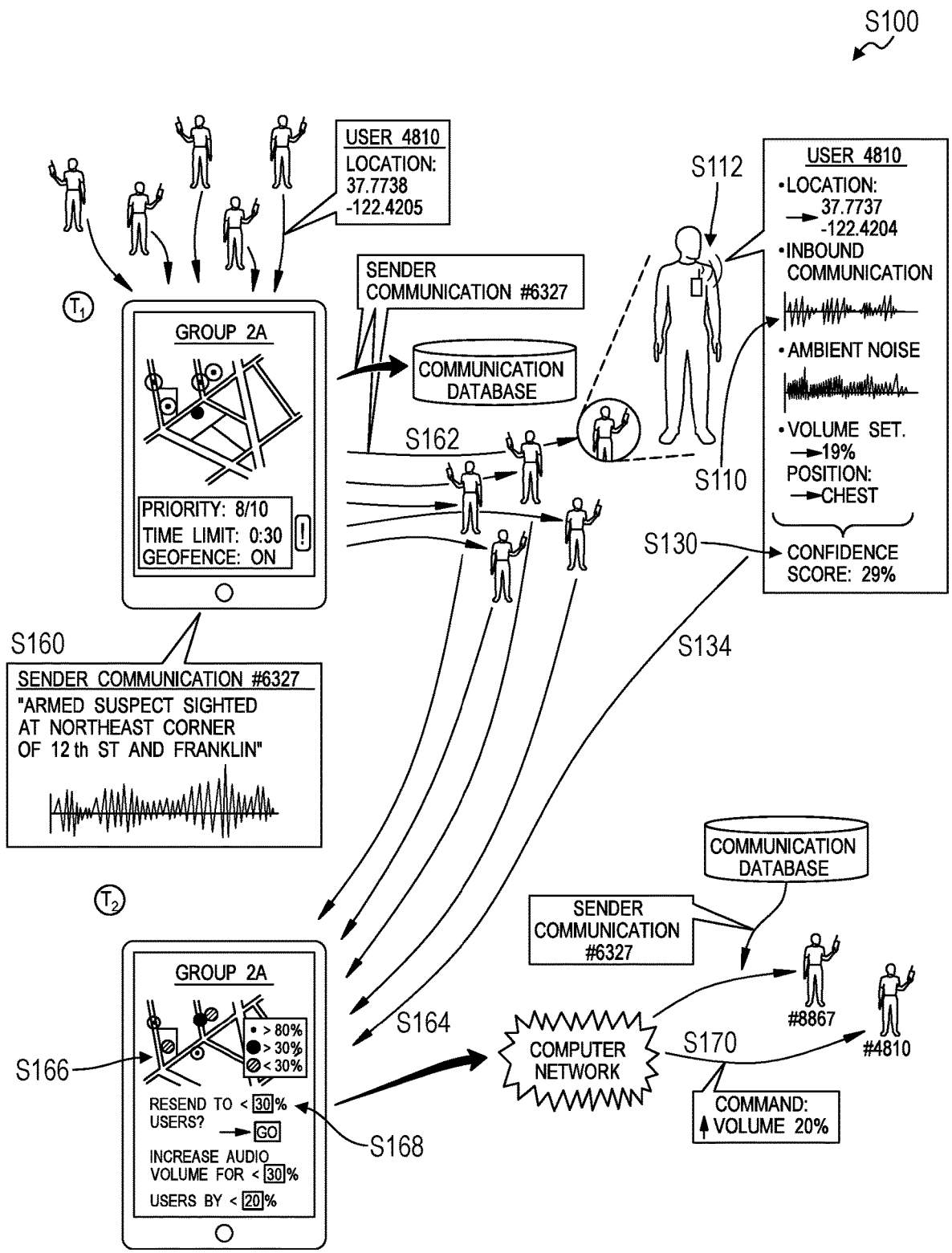
FIG. 5 is a flowchart representation of one variation of the method.

A similar variation of the method S100 shown in FIG. 5 includes: at an originating device, receiving an audio communication from a sender at a first time in Block S160; transmitting the audio communication, over a wireless network, to a set of mobile radios at approximately the first time, each mobile radio in the set of mobile radios associated with a user in a group of users in Block S162; receiving, from a first mobile radio in the set of mobile radios, a first confidence score that a first user associated with the first mobile radio heard the audio communication and a first geolocation of the first mobile radio at approximately the first time in Block S164; displaying, at the originating device, a representation of the first mobile radio, annotated with the confidence score, at the first geolocation on a spatial map in Block S166; at a second time succeeding the first time, receiving selection of a subset of mobile radios, in the set of mobile radios in Block S168; and transmitting a command, to each mobile radio in the subset of mobile radios, to increase a volume setting of the mobile radio in Block S170.

2. Applications

Generally, Blocks of the method S100 can be executed locally by a mobile radio (e.g., a half-duplex radio handset, a full-duplex mobile radio, a hybrid smartphone-radio handset, a hybrid smartwatch-radio handset) to: audibly output an inbound audio communication from an external device; cache this inbound audio communication; predict or confirm that a user carrying the mobile radio heard this inbound audio communication, such as based on ambient noise conditions and a volume setting on the mobile radio; and to automatically increase the volume setting on the mobile radio and replay this cached audio communication if the user is predicted to have not heard the audio communication originally (and if certain conditions attached to the audio communication are met, such as priority, time, and/or location conditions). In particular, Blocks of the method S100 can be executed by a mobile radio to output an inbound audio communication in real-time, to automatically verify that the inbound audio communication was heard (or comprehended) by a user carrying the mobile radio, and to automatically execute a sequence of actions to re-serve the audio communication to this user if the mobile radio is unable to verify that the user heard the audio communication originally, thereby increasing probabilities that audio communications inbound from other radio devices are heard and understood by the user when most urgent or relevant to the user.

For example, the mobile device executing Blocks of the method S100 can automatically cache an input audio communication while simultaneously outputting this audio communication—through an integrated or connected speaker at the current volume—as this audio communication is received from an originating device by the mobile radio. Around this time, the mobile radio can check the ambient noise level in its proximity, predict whether a user carrying the mobile radio heard this audio communication based on a difference between the ambient noise level and the current volume setting of the mobile radio, and return a receipt containing a probability that the user heard this audio communication (e.g., in the form of a confidence score or binary confirmation value). A sender at the originating device can then elect to remotely increase the volume setting at the mobile radio and trigger the mobile radio to replay the cached audio communication at this elevated volume. Alternatively, the sender may interface within the originating device or another connected device to set a time limit for the audio communication to be heard by the user at the mobile radio; the mobile radio can then replay the cached audio communication if the user increases the volume of the mobile radio before the conclusion of this time limit or automatically increase the volume setting of the mobile radio and replay the cached audio communication if the volume setting of the mobile radio is not otherwise increased prior to conclusion of the time limit. Yet alternatively, the sender may interface within the originating device or other connected device to assign a geofenced area to this audio communication; the mobile radio can then automatically adjust the volume setting of the mobile radio to a level audible to the user (e.g., based on a concurrent ambient noise level) and replay the cached audio communication when the mobile radio enters this geofenced area.

Therefore, Blocks of the method S100 can be executed by a mobile radio and an originating device to ensure that audio communications are heard by a recipient at the mobile radio even: if the recipient forgot to unmute her mobile radio after a break or after assisting a patron; if the recipient moved into a noisy environment; or if the recipient unintentionally reduced the volume setting on her mobile radio.

3. System

Blocks of the method S100 can be executed by the mobile radio: to receive an inbound audio communication; to output the audio communication in real-time via an integrated or connected speaker; to cache the audio communication in local memory; to predict whether a user carrying the mobile radio heard the audio communication when recently output by the mobile radio (e.g., based on an ambient noise level, the current volume setting at the mobile radio, and/or a hearing model previously generated and stored for the user); and to selectively adjust the volume setting of the mobile radio and to replay the cached audio communication based on conditions assigned to the audio communication and whether the mobile radio predicted that the user heard (or comprehended) the audio communication. More specifically, the mobile radio can execute these Blocks of the method S100: to predict whether a user carrying the mobile radio heard or comprehended a recent inbound audio communication; and to selectively adjust the volume setting of the mobile radio and replay a cached copy of the audio communication responsive to predicted failure of the user to hear or comprehend the audio communication when previously output by the mobile radio upon receipt from another originating device.

Other Blocks of the method S100 can be executed by the originating device and/or by a remote computer system (e.g., a remote server, a computer network) to assign priority, time, and/or location conditions to an outbound audio communication. The mobile radio can then automatically adjust its volume setting and selectively replay stored audio communications recently inbound from this originating device at such greater volumes in order to improve probability that the user heard and comprehended these audio communications. Additionally or alternatively, the mobile radio can execute Blocks of the method S100 to support remote control of its volume setting—including overwriting a last volume setting manually selected by the user carrying the mobile radio—via the originating device, thereby enabling a sender at the originating device (e.g., a supervisor, a dispatcher, a team lead) to improve probability or better ensure that the user at the mobile radio: has heard recent audio communications outbound from the originating device; will hear upcoming audio communications outbound from the originating device; and/or will hear other audio communications outbound from other mobile radios in the same working group (e.g., the same team, workforce).

In one implementation, a mobile radio includes: a cellular transceiver and a local area networking transceiver that support full-duplex, digital transmission of audio communications with other devices (e.g., other mobile radios within a group, a dispatcher); a geospatial position sensor configured to detect the geospatial location of the mobile radio; an audio output, such as in the form of an integrated speaker, an audio output jack, and/or a short-range wireless audio transmitter; a volume control, such as in the form of a knob or buttons; a microphone (or other sensor) configured to output a signal representative of ambient noise; a local memory; and a controller configured to execute Blocks of the method S100. The mobile radio can also include a display configured to render visual prompts for the user and/or a haptic module configured to output haptic prompts (e.g., vibrations) to the user, such as to increase the volume setting of the mobile radio. Thus, in this implementation, the mobile radio can receive audio communications in digital format over the cellular transceiver and/or over the local area networking transceiver and can output these audio communications via the integrated speaker or over a connected device.

In one variation, the mobile radio also includes a land mobile radio transceiver configured to support half-duplex person-to-person voice communications over a radio channel, such as within a VHF or UHF band. For example, radio base stations (e.g., repeaters)—such as including towers and antennas—can be installed within a building, throughout a campus, or within a geographic region to form a private land mobile network that supports low-bandwidth half-duplex communications between radio devices. Thus, in this implementation, the mobile radio can: receive audio communications in both digital format via the cellular transceiver and/or over the local area networking transceiver and in analog format via the land mobile radio transceiver; and output these audio communications via the integrated speaker or over a connected device.

Alternatively, the mobile radio can include an input audio jack configured to connect to a legacy land mobile radio device (hereinafter a "land mobile radio device"). In this implementation, the land mobile radio device can receive audio communication in analog format over a land mobile radio network, can output these audio communications via its integrated speaker, and can output these audio communications to the mobile radio via the input audio jack. The controller can then execute Blocks of the method S100 to predict whether the user heard or comprehended this analog audio communication output by the land mobile radio device and then either replay the audio communication at an elevated volume via the mobile radio's integrated speaker or transmit a digital query back to the originating device to resend the audio communication in digital format via the cellular transceiver and/or over the local area networking transceiver, such as described below.

Therefore, the mobile radio can include various communication functionalities: cellular communication technologies (e.g., to enable cellular communications between mobile radios over one or multiple cellular networks); wireless data communication technologies (e.g., to send and receive, text, audio, video, and controls data over IEEE 802.11 protocols); and/or full-duplex radio communication technologies. Similarly, the mobile radio can incorporate telemetry functionalities, such as: location services (e.g., to track a geospatial location of a mobile radio within a predefined geospatial coordinate system); orientation tracking (e.g., a compass heading of a mobile radio). Additionally or alternatively, the mobile radio can be connected to a mobile computing device, such as a smartphone, tablet, or other mobile computing device to access various functionality integrated into the mobile computing device, such as location services, cellular connectivity, and a digital display.

The mobile radio can also connect to other sensors and/or devices carried or worn by a user, such as via a wired connection or wireless connection (e.g., via a local ad hoc wireless network hosted by the mobile radio). For example, the mobile radio can: connect to a PASS device worn by a firefighter to monitor whether the firefighter has entered a harmful environment or is focusing on the task at hand rather than an inbound audio communication; and can return such status of the firefighter to other devices on the same network.

In one example, a mobile radio can be (permanently) assigned to one user within a team, workforce, or group of users operating within this private land mobile network. Alternatively, a fleet of mobile radios can be distributed and shared among a population of users over time, such as between shifts of workers or operators. Therefore, a mobile radio can also be temporarily or permanently assigned to a member of a team or group. This mobile radio can then execute Blocks of the method S100 to enable remote volume controls and/or audio communication condition controls at an originating device (e.g., a dispatcher radio) operated by a manager, supervisor, team lead, or group owner, etc. or by a remote computer system.

4. Audio Communication

Figure 2:
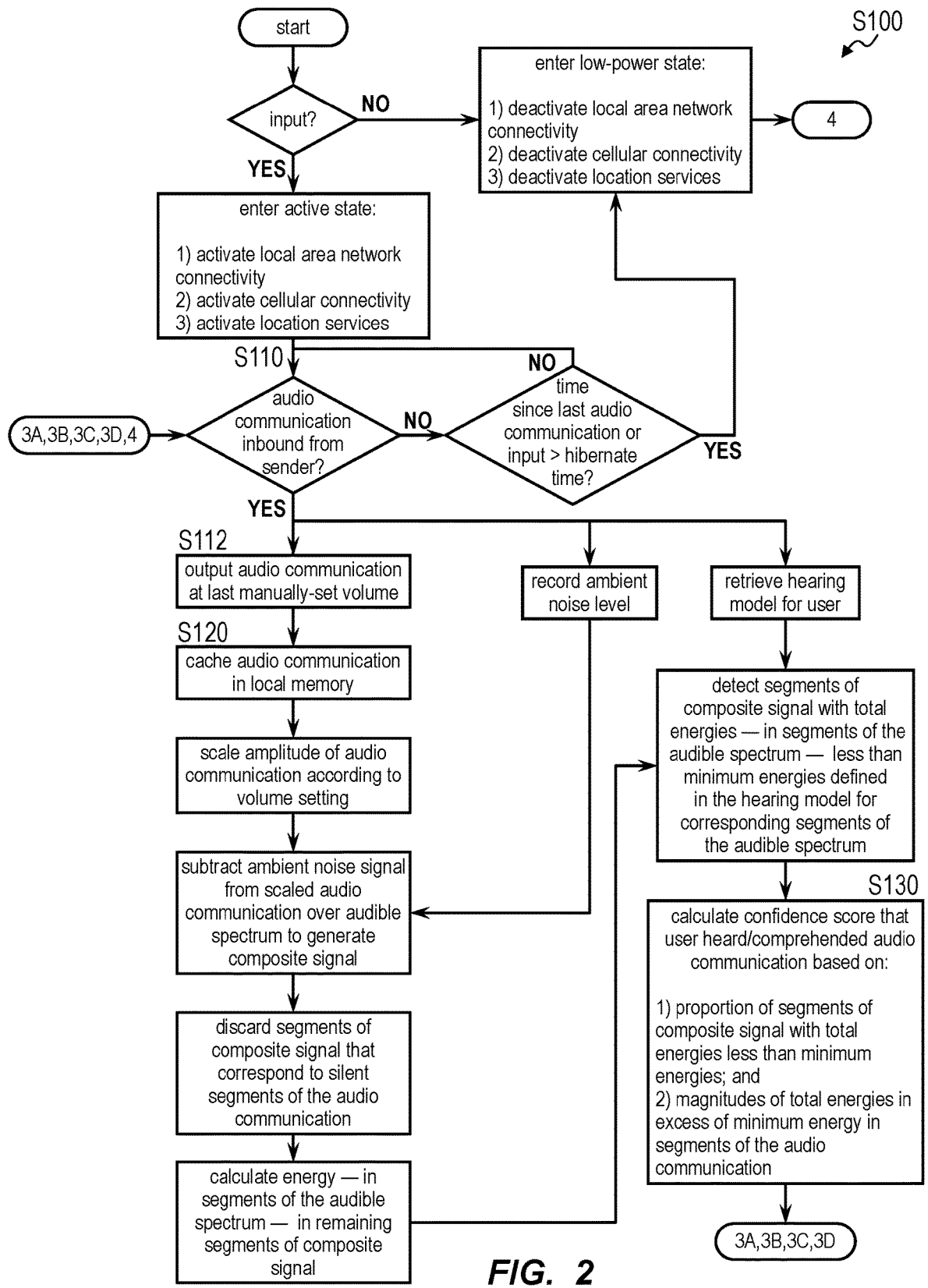
FIG. 2 is a flowchart representation of one variation of the method.

Block S110 of the method S100 recites receiving an audio communication from an originating device over a wireless network at a first time; and Block S112 of the method S100 recites outputting the audio communication—at approximately the first time—at a first volume level set manually by a user associated with the mobile radio prior to the first time. Generally, upon receipt of an audio communication from an originating device in Block S110, the mobile radio can automatically output the audio communication via an integrated audio speaker or via a wired or wireless audio output (e.g., to a connected external speaker, headset, or earphone) in Block S112, as shown in FIGS. 1 and 2.

4.1 Audio Communication Receipt

The mobile radio can also generate a receipt for this audio communication and return this receipt to the originating device (and/or to a remote computer system). For example, the mobile radio can generate a receipt that specifies: a unique identifier of the mobile radio; receipt time of the audio communication; duration of the audio communication; origin of the audio communication; a volume setting at the mobile radio at time of receipt of the audio communication; ambient noise level and/or ambient noise type (e.g., detected from a signal read from a primary or secondary microphone integrated into or connected to the mobile radio) at time of receipt of the audio communication; and/or a geospatial location of the mobile radio at time of receipt of the audio communication; etc. The mobile radio can then transmit this receipt to all other mobile radios on the same radio channel or specifically back to the device at which this audio communication originated (hereinafter the "originating device"). For example, the mobile radio can transmit this receipt in the form of a SMS text message back to the originating device.

A sender at the originating device may then review this receipt to verify whether the audio communication was received by the mobile radio. For a group of mobile radios on this channel during transmission of the audio communication by the originating device, these mobile radios can each return a receipt for the audio communication to the originating device, and the originating device can compile these receipts and present this aggregate receipt to the sender to indicate when, where, and who in this group received this audio communication.

4.2 Audio Communication Comprehension Confirmation

Block S130 of the method S100 recites calculating a confidence score that the audio communication was comprehended by the user based on the first volume setting; and Block S134 of the method S100 recites returning the confidence score to the originating device. Generally, in Blocks S130 and S134, the mobile radio can predict whether the user carrying the mobile radio (i.e., the "recipient") heard or comprehended the inbound audio communication and then populate a receipt with this prediction (and other metadata, such as the geospatial location of the mobile radio at time of receipt of the audio communication, such as described above) before returning this receipt to the originating device, as shown in FIGS. 2 and 3A-3D.

In one implementation, the mobile radio writes a binary value to the receipt indicating whether the user at the mobile radio is likely to have heard an inbound audio communication. In this implementation, the mobile radio can: access or calculate a threshold output volume: predict that the user carrying the mobile radio heard the inbound audio communication if the volume setting at the mobile radio exceeded this threshold volume when the audio communication was receipt and output by the mobile radio; and otherwise predict that the user carrying the mobile radio did not hear the inbound audio communication if the concurrent volume setting at the mobile radio did not exceed the threshold volume. For example, the mobile radio can implement a threshold volume model that outputs the threshold volume as a function of (e.g., proportional to) ambient noise level detected by the mobile radio, such as within a narrow audible frequency range characteristic of audio output of the mobile radio. In this example, the mobile radio can sample an integrated (or connected) microphone, detect ambient noise in this signal, and then adjust the threshold volume based on this signal and the threshold volume model, such as: intermittently throughout general operation of the mobile radio; or regularly (e.g., at a rate of 1 Hz) while an audio communication is inbound at the mobile radio. Thus, if the actual volume setting of the mobile radio falls below the current threshold volume calculated by the mobile radio at any time during transmission of an audio communication, the mobile radio can predict that the audio communication was not heard in its entirety by the user and thus return a negative receipt to the originating device.

In this implementation, the mobile radio can also implement a custom threshold volume model adjusted (or "customized") for: the user's physiological hearing ability; the audio output currently selected at the mobile radio (e.g., an integrated speaker, a connected headset, an earphone); and/or detected or known acoustic response of a space or location currently occupied by the mobile radio. (The mobile radio can similarly adjust a generic threshold volume model based on these parameters.)

This threshold volume model can also account for a state of the mobile radio. For example, if the user has entered an "away" state or a "busy" state at the mobile radio, the threshold volume model can output a higher threshold volume. Similarly, if the mobile radio detects that it is in a "running" state in which the user is running with the mobile radio, the threshold volume model can output a higher threshold volume. However, if the user has entered an "available" state at the mobile radio, the threshold volume model can output a lower threshold volume.

The mobile radio can similarly implement a threshold volume difference, such as by: predicting that the user carrying the mobile radio heard an inbound audio communication if the difference between the volume setting at the mobile radio and a concurrent ambient noise level detected by the mobile radio exceeded the threshold volume difference; and otherwise predict that the user carrying the mobile radio did not hear the inbound audio communication if this volume difference did not exceed the threshold volume difference.

Alternatively, the mobile radio can implement similar methods and techniques to calculate a probability (or "confidence score")—such as over a range of 0.00 to 1.00 in 0.01 intervals—that the user heard the inbound audio communication at the mobile radio. For example, the mobile radio can implement a comprehension probability model that outputs a confidence score that the user heard the inbound audio communication: proportional to a difference between the volume setting and ambient noise level during receipt of the audio communication; proportional to the user's known hearing ability (e.g., contained in a user profile stored locally on the mobile radio); proportional to a duration of the inbound audio communication; or based on whether the mobile radio is currently configured to output audio through an integrated or connected speaker.

In another implementation shown in FIG. 2, the mobile radio can also access a generic hearing model or a custom hearing model specific to the user, wherein this hearing model defines minimum energies of an audio signal—in excess of ambient noise—necessary for a generic operator or the user specifically to comprehend audible content across the audible spectrum or within discrete segments of the audible spectrum. In this implementation, while outputting an inbound audio communication at a last user-selected volume setting in Block S112, the mobile radio can: scale the amplitude of an output signal representing the audio communication according to this manually-selected volume setting; capture a concurrent ambient noise signal from a microphone in the mobile radio; subtract this ambient noise signal from the scaled output signal over the audible spectrum; discard segments of this composite signal that correspond to silent segments of the audio communication (e.g., segments of the original input signal containing signal amplitudes that fall below a minimum signal amplitude); and calculate an energy—over the entire audible spectrum or in discrete segments of the audible spectrum—in each remaining segment (e.g., 100-millisecond interval) of this composite signal. The mobile radio can then compare energies of these segments of the composite signal to minimum energies across the audible spectrum or within discrete segments of the audible spectrum defined in the hearing model. For example, the system can predict that the user failed to hear or comprehend the audio communication (e.g., a confidence score less than "0.05") if more than a threshold proportion (e.g., 30%) of segments in the composite signals contain energies less than the minimum energy specified in the hearing model. Similarly, the mobile radio can calculate a confidence score that the user comprehended the audio communication proportional to a proportion of segments in the composite signals that contain energies in excess of the minimum energy specified in the hearing model. Additionally or alternatively, the mobile radio can calculate a confidence score that the user comprehended the audio communication proportional to an integral of energies of segments of the composite signal, less the minimum energies specified in the hearing model for each segment of the audible spectrum over the duration of the audio communication and normalized for a duration of the audio communication.

The mobile radio can also derive a high confidence that the user heard the inbound audio communication if the user selected a button on the mobile radio to confirm receipt of audio communication or if the user transmitted an outbound communication on the same radio channel soon after (e.g., within ten seconds of) completion of playback of the inbound audio communication at the mobile radio. For example, the mobile radio can receive an audio communication from the originating device at a first time in Block S110 and then output the audio communication—at the last volume setting set manually by the user—at approximately the first time (e.g., in real-time, within 500 milliseconds of receipt). In this example, following output of the audio communication at approximately the first time (e.g., upon conclusion of the audio communication), the mobile radio can output a prompt—such as an audible prompt (e.g., a "ping"), a visual notification (e.g., a flashing indicator light), and/or a haptic prompt (e.g., a vibration)—to the user to confirm comprehension of the audio communication. The mobile radio can then calculate a low confidence score that the audio communication was comprehended by the user in response to absence of confirmation of comprehension of the audio communication from the user within a threshold duration of time (e.g., five seconds) following the first time. Accordingly, the mobile radio can: return this low confidence score to the originating device; enable remote volume control of the mobile radio via the originating device; or automatically increase the volume of the mobile radio. Additionally or alternatively, responsive to this low confidence score, the mobile radio can automatically: increase the volume of the mobile radio; and replay the audio communication at this increased volume—such as within five seconds of completion of the preceding playback of the audio communication by the mobile radio. Conversely, if the user manually confirms comprehension of the audio communication—such as by selecting a confirmation button on the mobile radio or by returning a responsive audio communication back to the originating device within a preset duration of time (e.g., five seconds) of completion of the preceding audio communication—the mobile radio can calculate a high confidence score for comprehension of the audio communication by the user and return this high confidence score to the originating device accordingly.

In the foregoing implementations, the mobile radio can also adjust the confidence score based on how the mobile radio is worn or carried by the user. For example, the mobile radio can intermittently: sample an integrated motion sensor or inertial measurement unit; and pass a signal read from the motion sensor or inertial measurement unit into a motion model to predict whether the user is holding the mobile radio, wearing the mobile radio on her waist, wearing the mobile radio on her chest or collar, or separated from the mobile radio. The mobile radio can then adjust or calculate the confidence score that the audio communication was comprehended by the user as a function of the position of the mobile radio on the user, such as by: calculating a highest confidence score if the mobile radio is carried by the user (i.e., because the user may be attentive to the mobile radio and its outputs when handling the mobile radio); calculating a higher confidence score if the mobile radio worn on the user's collar or chest where its speaker is near the user's ear; calculating a lower confidence score if the mobile radio worn on the user's waist; and calculating null confidence score if the mobile radio is separated from the user.

Therefore, the mobile radio can calculate a confidence score for the user and the audio communication: as an inverse function of the concurrent ambient noise level; as a function of the current volume setting of the mobile radio; as a function of the position of the mobile radio on the user; and/or based on the hearing model. However, the mobile radio can implement any other method or technique to predict whether the user heard the inbound audio communication in Block S130, to quantify or qualify this prediction, and to return this prediction to the originating device in Block S134.

5. Transmit-Side Audio Communication Confirmation

In one variation, the mobile radio then interfaces with the originating device to respond to a low confidence score that the user heard or comprehended the last audio communication transmitted by the originating device, such as by resending or automatically replaying the audio communication—such as at a different volume, time, and/or location—at the mobile radio on behalf of the user. In particular, in this variation, the mobile radio can communicate a probability, likelihood, or confidence that the user at the mobile radio heard or comprehended the last audio communication received from the originating device, as described above. The originating device can then respond to this possible communication failure automatically or interface with the sender to respond to this possible communication failure: if the confidence score for comprehension of the audio communication by the user is less than a preset threshold; if the confidence score for comprehension of the audio communication by the user is less than a threshold set by the sender for a current group containing the user or for a current situation involving the user; or if the mobile radio otherwise predicts that the user did not hear or was unlikely to have comprehended this audio communication.

5.1 Automatic Confirmation with Manual Audio Communication Resend

In one implementation, upon receiving indication from a mobile radio that an audio communication outbound from the originating device was likely not heard by the recipient, the originating device can render this status of the audio communication for this recipient on a display integrated into or connected to the originating device. The sender at the originating device may then elect to send a text (e.g., email, SMS) communication—in place of an audio communication—to the mobile radio or to another device associated with the recipient.

Alternatively, if the sender is a team lead or otherwise retains master control of the recipient's mobile radio, the sender's originating device can interface with the mobile radio to enable remote volume control of the mobile radio. Accordingly, the sender at the originating device may manually select an option at the originating device to increase output volume of this recipient's mobile radio and repeat her last message into the originating device. The originating device can then transmit a command to increase output volume and a second audio communication—analogous to the unheard audio communication—back to the mobile radio.

5.2 Automatic Audio Communication Confirmation and Resend

In another implementation, as the sender speaks a new audio communication into the originating device, the originating device can record this audio communication in local memory while also transmitting the audio communication to a mobile radio concurrently occupying the same audio channel. If the mobile radio determines that the recipient at the mobile radio is unlikely to have heard the audio communication (e.g., if the concurrent volume setting of the mobile radio was less than a threshold volume), the mobile radio can return a receipt containing a flag for this audio communication to the originating device. If the originating device and the mobile radio are the only two devices sharing this radio channel at this time, the originating device can automatically regularly resend the audio communication—stored in local memory—back to the mobile radio, such as on a 30-second interval, until: the mobile radio predicts that the recipient heard the message (e.g., until the current volume setting of the mobile radio exceeds a threshold volume); until the recipient confirms receipt of the audio communication by selecting a confirmation button on the mobile radio; or until the recipient initiates an audio communication back to the originating device.

Alternatively, if multiple devices are sharing this radio channel, the originating device can intermittently transmit a command to the mobile radio (and not other mobile radios) to increase its volume setting (e.g., by 10%) and resend the cached audio communication on the radio channel, such as on a 30-second interval, until the mobile radio confirms that the recipient heard the audio communication at the mobile radio. Once the mobile radio confirms that the recipient heard the audio communication at the mobile radio, the originating device can send a command to the mobile radio to return its volume to the last volume setting selected by the recipient.

5.3 Automatic Audio Communication Resend with Remote Volume Control

In a similar implementation, if the mobile radio determines that the recipient at the mobile radio is unlikely to have heard the audio communication, the mobile radio can return a receipt containing a flag for this audio communication to the originating device. The originating device can then prompt the sender to specify a priority of the audio communication. If the sender indicates that the priority of the audio communication is low, the originating device can: preserve the audio communication in local memory; serve a command to the mobile radio to confirm when its volume setting exceeds a threshold volume or exceeds an ambient noise level by more than a threshold volume difference; and then resend the audio communication to the mobile radio (and to other mobile radios on the same radio channel) responsive to receipt of such confirmation from the mobile radio. Conversely, if the sender indicates that the priority of the audio communication is high, the originating device can: send a command to the mobile radio to automatically increase its volume; and resend the cached audio communication to the mobile radio (and to other mobile radios on the same radio channel).

Similarly, the originating device can prompt the sender to indicate time criticality of the audio communication. For example, the originating device can render—on an integrated or connected display—both: a notification that the recipient of an audio communication recently transmitted from the audio communication is unlikely to have been heard by a recipient due to a low-volume setting of the mobile radio; and a prompt to indicate a time limit for the recipient to hear this audio communication. In this example, the sender may set—through the originating device or connected device—a time limit for the recipient to receive the audio communication. The originating device can then: set a timer for this time limit; preserve the audio communication in local memory; serve a command to the mobile radio to confirm when its volume setting exceeds a threshold volume or exceeds an ambient noise level by more than a threshold volume difference; and then resend the audio communication to the mobile radio (and to other mobile radios on the same radio channel) responsive to receipt of such confirmation from the mobile radio before the timer expires. However, if the originating device fails to receive such volume change confirmation from the mobile radio before the timer expires, the originating device can: transmit a command to the mobile radio to automatically increase its volume (e.g., to above a local ambient noise level); retransmit the audio communication to the mobile radio; and then discard the audio communication from local memory once the mobile radio confirms that the audio communication was heard by the recipient.

Similarly, the originating device can prompt the sender to link the audio communication to a geospatial location or geofenced area. For example, the originating device can render—on an integrated or connected display—both: a notification that the recipient of an audio communication recently transmitted from the originating device is unlikely to have been heard by a recipient due to a low-volume setting of the mobile radio; and a prompt to define a geospatial boundary of a location in which this audio communication is relevant. The originating device can then: track the mobile radio based on geospatial location pings received from the mobile radio (e.g., on a twenty-second interval); interface with a third-party location service to track the location of the mobile radio; or query the mobile radio directly for its geospatial location. The originating device can also: store the audio communication in local memory or in a remote database; and then serve a command to the mobile radio to increase its volume setting (e.g., over a local ambient noise level) and resend the stored audio communication to the mobile radio when the location of the mobile radio falls within the geospatial boundary previously linked to the audio communication by the sender.

5.4 Automatic Audio Communication Confirmation and Voice to Text

Additionally or alternatively, in response to receipt from the mobile radio that an audio communication outbound from the originating device was not heard by the recipient at the mobile radio (or that the volume setting at the mobile radio was below a threshold, etc.), the originating device can: automatically transcribe the audio communication to a text communication (or offload the audio communication to a remote computer system, such as via a wireless network, for transcription); and then send this text communication to mobile radio, such as in the form of a SMS text message. Upon receipt, the mobile radio can render this text communication on an integrated or connected display; the mobile radio can also pull the audio communication from the originating device (or from the remote computer system) and replay the audio communication locally, such as when the recipient selects the text communication at the mobile radio.

In a similar implementation, the mobile radio implements a text-to-speech engine transform and output unread textual communications and notifications in audible format. For example, these textual communications and notifications may be rendered on a display on a connect mobile device, and the mobile radio can: receive these textual communications from the mobile device; transform these textual communications into audible format; and output these audible communications in real-time or when a volume setting on the mobile radio exceeds a threshold volume, as described above. Similarly, when multiple audio communications have been received at the mobile radio and stored in local memory, such as due to a low volume setting at the mobile radio, the mobile radio can: implement a speech-to-text engine to transform these audio communications into text in order to reduce memory allocation for these audio communications; and later implement a text-to-speech engine to transform these text communications back into audio communications and output these audio communications for the user, such as when the volume setting at the mobile radio is adjusted to exceed a volume threshold.

6. Preemptive Audio Communication Conditions

In one variation, the sender may adjust the volume (or volume difference from a local ambient noise level) at a mobile radio—selected to receive an audio communication—before generating (e.g., speaking) the audio communication at her originating device. The originating device can then transmit a command for this volume setting followed by the audio communication to the mobile radio; and the mobile radio can output this audio communication—at the volume setting specified in the command—in real-time for consumption by the recipient.

In a similar implementation, the sender may specify priority, a time limit, a geofenced area, and/or other conditions for an audio communication before speaking the audio communication into her originating device. The originating device can then interface with mobile radios—designated as recipients for this audio communication or sharing the same radio channel—to output this audio communication for their users according to these conditions and according to methods and techniques described above. The sender (or a supervisor) can also set different priorities, time limits, georeferenced areas, volume settings, and/or other conditions for different radio channels supported by this group of mobile radios.

7. Receive-Side Audio Communication Confirmation

Alternatively, the mobile radio can implement similar methods and techniques: to store (or "cache") an inbound audio communication in local memory in Block S120; to automatically adjust its volume setting in Block S140; and to automatically replay the audio communication for its user in Block S142 responsive to a low confidence that the user heard or comprehended the audio communication and based on local conditions, events, or parameters specified by the sender, as shown in FIGS. 2 and 3A-3D.

In particular, this variation of the method S100 includes Block S132, which recites accessing a priority of the audio communication defined at the originating device. Generally, in Block S132, the mobile radio can retrieve parameters for replaying a recent inbound audio communication for the user, such as responsive to a low confidence that the user heard or comprehended the audio communication when first output by the mobile radio.

In one implementation, a sender selects a radio channel or radio group and speaks an audio communication into her originating device, which transmits the audio communication to a mobile radio on this radio channel or in this group. Upon receipt of this audio communication, the mobile radio stores the audio communication in local memory in Block S120 and concurrently outputs the audio communication at the current volume setting in Block S112. However, if the mobile radio determines that the user (i.e., the recipient) has not heard or comprehended the audio communication (e.g., due to a null or low-volume setting at the mobile radio) or is unlikely to have heard the audio communication (e.g., due to a high ambient noise and low volume setting at the mobile radio, due to extensive motion of the mobile radio) in Block S130, the mobile radio can transmit a query for priority, time constraints, and/or location constraints for the audio communication to the originating device in Block S132, such as over the same radio channel or via other communication protocol (e.g., via a cellular or local ad hoc network). Upon receipt of this query, the originating device (or a connected computing device) can prompt the sender to assign a priority, a time constraint, and/or a location constraint to the audio communication, which the originating device (or connected computing device) can then return to the mobile radio. The mobile radio can then selectively increase its volume setting—without manual input from its user—in Block 140 and/or replay the cached audio communication for the user in Block S142 according to these constraints.

Alternatively, rather than retrieving priority information for an audio communication after calculating a low confidence that the user comprehended the audio communication when first output by the mobile radio, the originating device can instead transmit such priority, time, and/or location constraints for the audio communication to the mobile radio concurrently with the audio communication. The mobile radio can then implement these constraints to selectively increase its audio output volume setting and/or replay the audio communication according to methods and techniques described above.

7.1 Sender-Specified Priority

Figure 3A:
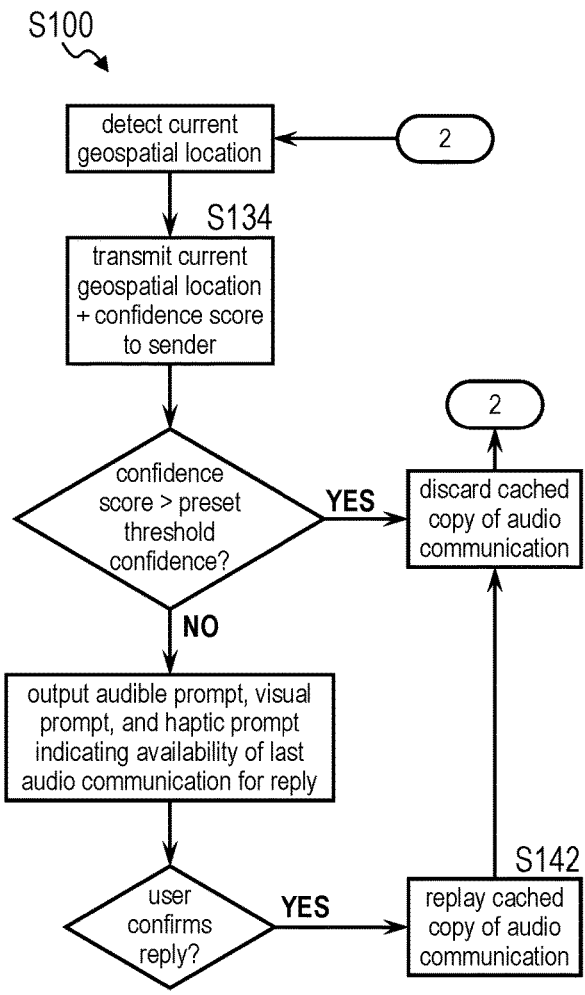
FIGS. 3A, 3B, 3C, and 3D are flowchart representations of one variation of the method.
Figure 3B:
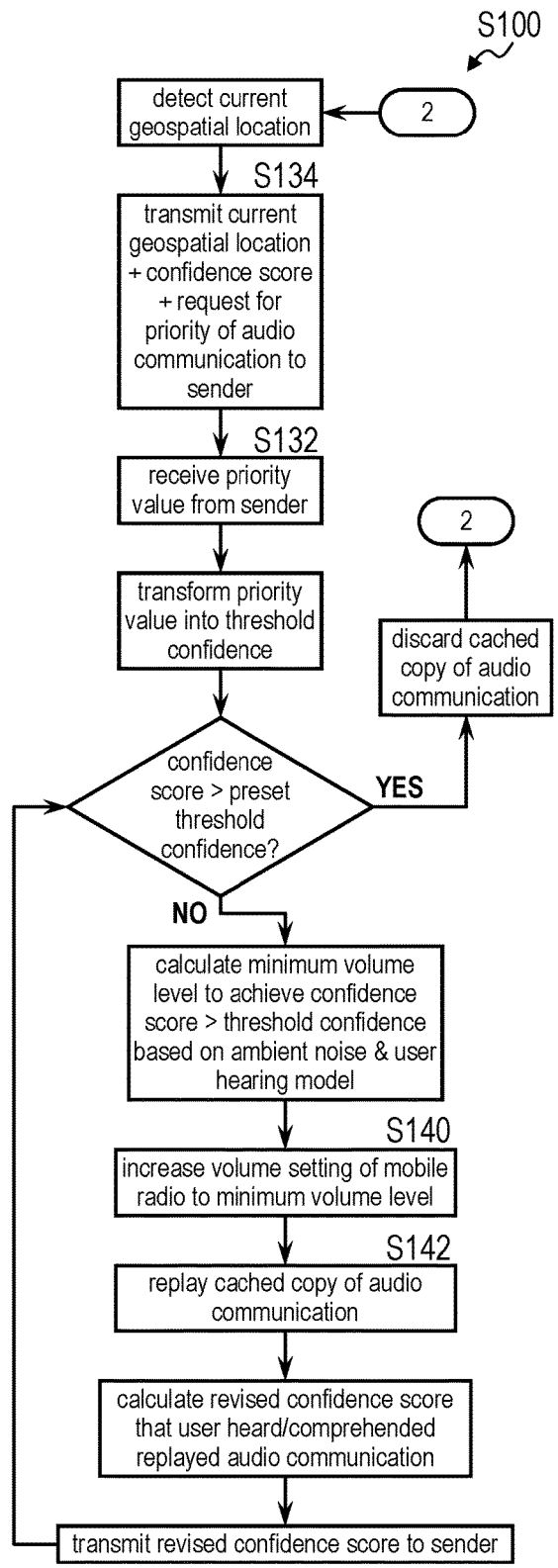

In one implementation shown in FIG. 3B, if the sender indicates that the audio communication is high-priority, the mobile radio can immediately and automatically: increase its volume (e.g., to a minimum offset above a current ambient noise level); output the inbound audio communication; and then return the volume of the mobile radio to its previous setting. However, if the sender indicates that the audio communication is low-priority, the mobile radio can: cache the audio communication in local memory; and then replay the cached audio communication when the user manually increases the volume setting at the mobile radio or when the volume setting at the mobile radio exceeds an ambient noise level by more than a threshold volume difference (e.g., responsive to a reduction in ambient noise level and/or responsive to a manual increase in the volume setting at the mobile radio) at a later time. Therefore, in this example, the sender may assign a high-priority to the audio communication, and the mobile radio can automatically increase its volume and playback the audio communication—with minimal delay (e.g., less than five seconds from first output of the audio communication)—accordingly. Alternatively, the sender may assign a lower priority to this audio communication, and the mobile radio can playback the audio communication at the earlier of expiration of an extended delay duration (e.g., up to 30 seconds) or manual increase in the volume setting of the mobile radio.

In a similar implementation, the sender may set a priority of an audio communication at the originating device—such as from a pre-populated list of audio communication priorities (e.g., from "1" to "10"; or low, moderate, high)—before transmitting the audio communication to the mobile radio. The originating device can then transmit the audio communication to the mobile radio with this priority value. Upon receipt of the audio communication, the mobile radio can: output the audio communication; cache the audio communication in local memory; and interpret a minimum confidence for comprehension of this first output of the audio communication based on (e.g., proportional to) the priority of the audio communication. The mobile radio can then: calculate a confidence score for comprehension of the audio communication by the user when first output by the mobile radio; and replay the audio communication—from local memory—at an elevated volume setting if this confidence score is less than the minimum confidence set for the audio communication. (Furthermore, in this implementation, rather than set a priority of the audio communication, the sender may directly set this minimum confidence.)

7.2 Sender-Specified Time Limit

Figure 3C:
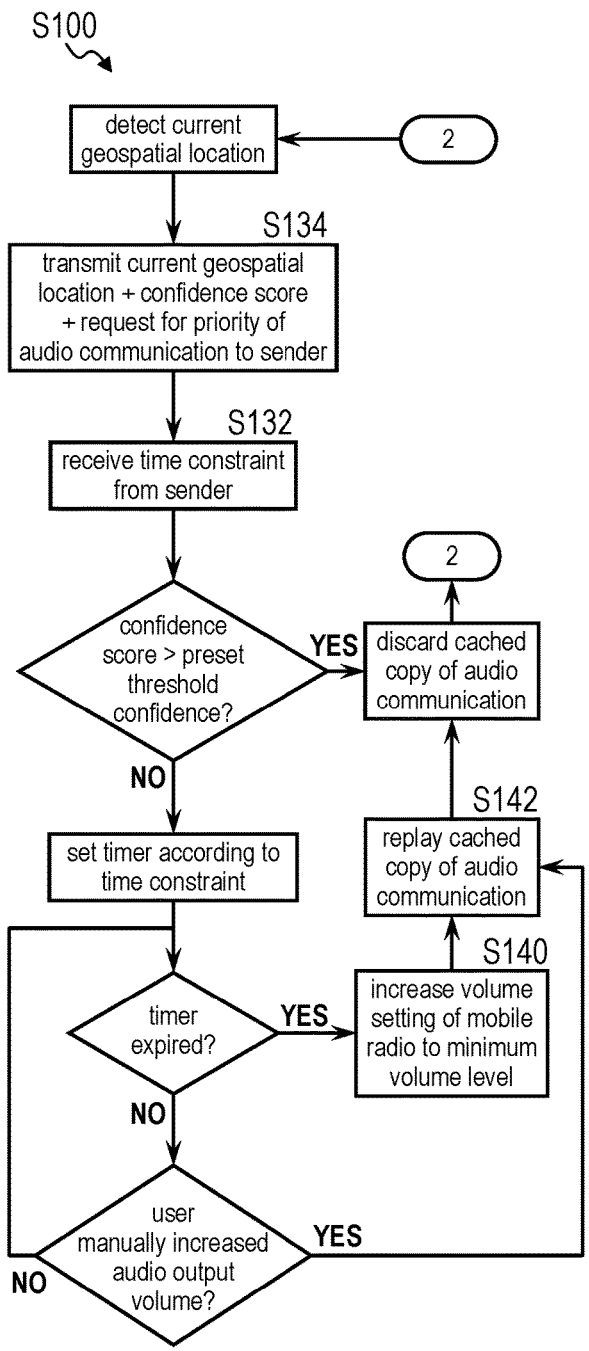

In another implementation shown in FIG. 3C, if the sender sets a time limit for the audio communication, the mobile radio can: set a timer for this time limit (e.g., from the time the audio communication was initially received); and replay the cached audio communication automatically if the user increases the volume setting at the mobile radio or if the volume setting at the mobile radio exceeds an ambient noise level by more than a threshold volume difference before expiration of the timer. However, if the timer expires before the mobile radio replays the audio communication, the mobile radio can automatically: increase its volume (e.g., to a minimum offset above a current ambient noise level); replay the cached audio communication; and then return the volume of the mobile radio to its previous setting.

In a similar implementation, the sender may set—at the originating device—a time limit for comprehension of an audio communication (e.g., from five seconds to five minutes) before transmitting the audio communication to the mobile radio. The originating device can then transmit the audio communication to the mobile radio with this time limit. Upon receipt of the audio communication, the mobile radio can: output the audio communication; cache the audio communication in local memory; and calculate a confidence score for comprehension of the audio communication by the user when first output by the mobile radio. Then, in response to this confidence score falling below a threshold confidence (e.g., a preset confidence score, a confidence score set by the sender, or a confidence score derived from a priority set by the sender), the mobile radio can initiate a timer for a duration of the time limit. Subsequently, in response to expiration of the timer prior to manual increase of the audio output volume of the mobile radio, the mobile radio can: automatically increase the audio output volume of the mobile radio; and replay the audio communication—from local memory—at this increased audio output volume. However, in this implementation, if the user manually increases the volume of the mobile radio and/or if the ambient noise level decreases sufficiently to result in the user hearing the audio communication upon subsequent output, the mobile radio can playback the audio communication from local memory. The mobile radio can also recalculate a confidence score for comprehension of the audio communication by the user during this second output by the mobile radio and repeat the foregoing process until the mobile radio calculates a sufficient confidence that the user heard or comprehended the audio communication.

7.3 Sender-Specified Location Constraint

Figure 3D:
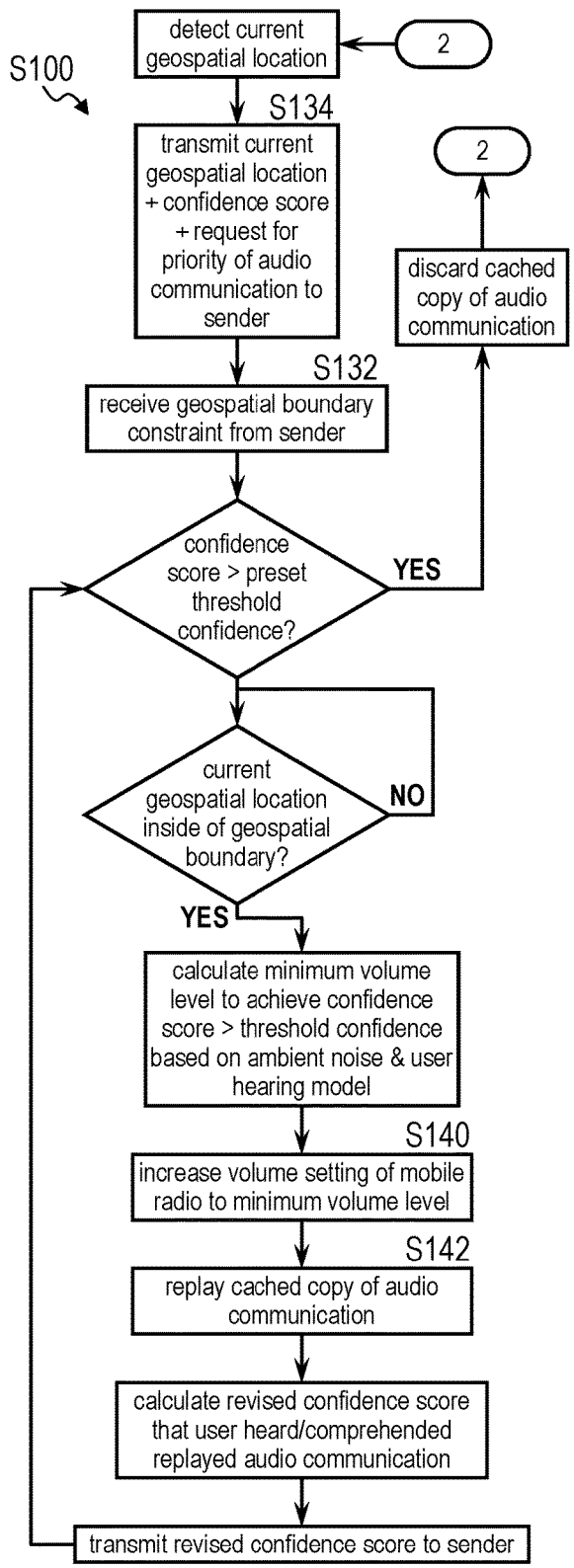

In yet another implementation shown in FIG. 3D, if the sender specified a georeferenced boundary for the audio communication, the mobile radio can automatically: track its location; confirm that its volume exceeds a current ambient noise level and replay the cached audio communication responsive to the mobile radio entering this georeferenced boundary; and then return the volume of the mobile radio to its previous setting.

In a similar implementation, the sender may specify—at the originating device—an urgency of the audio communication within a geospatial boundary, such as by: selecting waypoints on a geospatial map rendered on a display integrated into or connected to the originating device to define a geospatial boundary; and then assigning a priority to this audio communication and/or a time limit for hearing this audio communication, such as described above. The originating device can then transmit the audio communication to the mobile radio with this geospatial urgency specification. Upon receipt of the audio communication, the mobile radio can: output the audio communication; cache the audio communication in local memory; calculate a confidence score for comprehension of the audio communication by the user when first output by the mobile radio; and retrieve the current geospatial location of mobile radio. If the geospatial location of the mobile radio falls within this geospatial boundary and if the confidence score for comprehension of the audio communication by the user—when first output by the mobile radio—is less than a threshold confidence, the mobile radio can implement methods and techniques described above to replay the audio communication at increased volume according to the priority or time limit defined by the sender. Conversely, if the user is currently outside of the geospatial boundary assigned to this audio communication but the confidence score for comprehension of the audio communication by the user—when first output by the mobile radio—is less than a threshold confidence, then the mobile radio can queue the audio communication for playback when the mobile radio later enters this geospatial boundary and can track its geospatial location accordingly. Later, in response to the geospatial location of the mobile radio falling within the geospatial boundary, the mobile radio can: characterize an ambient noise level; estimate a position of the mobile radio on the user; calculate a minimum audio output volume predicted to yield a high confidence (e.g., greater than 95%) that the user will comprehend audio outputs from the mobile radio based on the ambient noise level and the position of the mobile radio on the user; set the audio output volume of the mobile radio to this minimum audio output volume (unless the current audio output volume setting exceeds this minimum audio output volume); and then replay the audio communication from local memory.

In a similar implementation, the sender may define a group of users linked to a geospatial boundary. While the mobile radio occupies locations outside of the geospatial boundary, the mobile radio can: receive a sequence of audio communications from mobile radios in this group of mobile radios; and store this sequence of audio communications in local memory. Later, in response to the geospatial location of the mobile radio falling within the geospatial boundary, the mobile radio can: calculate a minimum audio output volume predicted to yield a high confidence (e.g., greater than 95%) that the user will comprehend these cached audio communications when output by the mobile radio, such as described above; set the audio output volume of the mobile radio to this minimum audio output volume (unless the current audio output volume setting exceeds this minimum audio output volume); and then replay the cached sequence of audio communications from local memory.

In another implementation, the sender may similarly define a group of users linked to a geospatial location. As mobile radios within this group transmit audio communications to other mobile radios in the group, the remote computer system can record and store these audio communications, such as in a rolling buffer containing the last two minutes of audio communications between mobile radios in this group. Later, when the sender adds a new user to this group and once the new user's mobile radio enters the geospatial boundary, the remote computer system can download the contents of the buffer to the new user's mobile radio, which can then implement the foregoing methods and techniques to selectively set its audio volume output and to playback these past audio communications within the group.

(In the foregoing implementation, the originating device and/or the remote computer system can implement similar methods and techniques to transmit a last audio communication transmitted by the sender or a recent sequence of audio communications broadcast within a group defined by the sender to a new mobile radio added to the group, such as when the user enters a geospatial boundary defining this group or when manually added to the group by the sender. The new mobile radio can then execute methods and techniques described here to automatically modify its volume output setting and to selectively replay these audio communications based on confidence scores that its user heard these audio communications.)

7.4 Preemptive Sender-Defined Controls

In a similar variation, the originating device can serve priority, time, and/or location constraints for the audio communication to the mobile radio concurrently with the audio communication. In this variation, the mobile radio can implement these constraints to adjust its volume setting and selectively output a first instance output of the audio communication to the recipient according to methods and techniques described above.

8. Internal Contextual Controls

Additionally or alternatively, the mobile radio can implement internal contextual controls to selectively modify its output volume and/or replay a stored audio communication.

8.1 Motion

In one implementation in which the mobile radio includes a motion sensor (e.g., an IMU, an accelerometer), if the mobile radio detects that its user is running or is otherwise occupied based on outputs of the motion sensor, the mobile radio can: store the inbound audio communication; and later replay the audio communication—such as at an elevated volume—when the mobile radio detects that the user is no longer running or otherwise substantially occupied based on outputs of the motion sensor. Similarly, the mobile radio can: monitor conversations occurring in its vicinity (e.g., conversations likely involving the user); store an inbound audio communication if a nearby conversation is detected during receipt of this audio communication; and later replay the audio communication when the mobile radio no longer detects a conversation nearby. Therefore, the mobile radio can automatically adjust its volume based on a state of the mobile radio, such as indicated by the user or detected automatically by the mobile radio.

8.2 Internal Incremental Volume Control

In yet another implementation, following receipt of an audio communication, the mobile radio caches the audio communication and replays the audio communication at increasing volumes on a regular interval (e.g., with ten-second intervals between consecutive replays of the audio communication) until the recipient confirms comprehension of the audio communication, such as: by selecting a "confirm" button on the mobile radio; or by transmitting an outbound audio communication back to the originating device or otherwise on the same radio channel.

For example, in this implementation, the mobile radio can incrementally increase its volume setting: as a function of a number of inbound audio communications that the mobile radio predicts were not heard or comprehended by the user; or proportional to a frequency of inbound audio communications (i.e., a number of inbound audio communications per unit time) until the mobile radio predicts that the user is consistently hearing these audio communications. During this period of time, the mobile radio can also cache these inbound audio communications that the mobile radio predicts that the user did not hear and then replay these audio communications responsive to selection by the user.

Generally, a frequency of inbound audio communications at a mobile radio—within a team, workforce, or group—may increase naturally as a function of urgency. Therefore, in this implementation, the mobile radio can incrementally increase its volume setting over time as the frequency of inbound audio communications received by the mobile radio increases in order to raise a probability that the user will hear an inbound audio communication in the sequence, perceive a level of urgency in this audio communication, and elect to manually increase the volume setting of the mobile radio accordingly. In this implementation, the mobile radio can also store these audio communications in local memory for later playback, such as for a limited duration of time (e.g., up to three minutes or until the played back for the user). Then, if the user considers these previous audio communications to be of interest (e.g., after hearing or comprehending a later audio communication in this sequence output by the mobile radio at a higher volume interval), the user may select a playback control on mobile radio, and the mobile radio can playback these stored audio communications accordingly.

Therefore, in this implementation, the mobile radio can increase probability of comprehension of inbound audio communications by: adjusting its volume setting over a period of time; and storing these inbound audio communications without—or in addition to—returning receipts for these audio communications to their originating devices, waiting for condition data from these originating devices, and/or enabling direct remote volume control of the mobile radio via these originating devices.

Furthermore, in this variation, if the mobile radio detects a collision between replay of a stored audio communication and a new inbound audio communication, the mobile radio can: implement the foregoing methods and techniques to store the new inbound audio communication while replaying the stored audio communication; and then replay the new inbound audio communication stored in local memory. Conversely, responsive to detecting such a collision, the mobile radio can cease replay of the stored audio communication until output of the new inbound audio communication is complete and then resume output of the stored audio communication, such as from its beginning.

8.3 Location-Based Volume Persistence

As described above, the mobile radio can increase the audio output volume of the mobile radio responsive to the mobile radio entering a geospatial boundary specified by the sender in order to increase a confidence that the user will hear or comprehend an audio communication received from the sender. In one implementation, the mobile radio can also: track its geospatial location; maintain this mobile radio-controlled volume while the mobile radio remains inside of the geospatial boundary specified by the sender; and continue to output audio communications—inbound from the sender and/or other users in the same group—at this mobile-radio-controlled volume. Later, when the geospatial location of the mobile radio falls outside of this geospatial boundary, the mobile radio can automatically return the audio output volume of the mobile radio to the last volume setting manually selected by the user.

In this implementation (and other implementations described herein), the mobile radio can also output audible, visual, or haptic notifications (e.g., a ping, a blinking light element, a vibration) to indicate to the user that the mobile radio is lowering its audio output to the user's last manually-elected setting, such as unless the user cancels this automatic action within a threshold time (e.g., five seconds) of this notification(s).

8.4 Time-Based Volume Persistence

In another implementation, after increasing the audio output volume of the mobile radio responsive to a low confidence that the user comprehended a recent audio communication from a dispatch, administrator, supervisor, or other authority, the mobile radio can: set a timer for a volume hold duration (e.g., for one minute); output audio communications inbound from this authority and/or other users in the same group (e.g., other team members, coworkers, other operators) at this elevated audio output volume while this timer is active; and then return the audio output volume of the mobile radio to the last volume setting manually selected by the user when this timer expires.

9. Direct Sender Volume Control

In another implementation, if the mobile radio predicts that the recipient did not hear the audio communication recently received from an originating device and if the originating device is designated as a manager or supervisor device, the mobile radio can: enable remote control of its volume to the originating device; adjust its volume based on commands received from the originating device, such as over the same radio channel or via other communication protocol; and either replay the cached audio communication when prompted by the originating device or output a new audio communication received from the originating device at this new volume setting.

10. Group Audio Communications

In one variation, the originating device transmits an audio communication to multiple mobile radios (or a "group" of mobile radios)—such as occupying a radio channel or selected manually by the sender. In this variation, these mobile radios can implement methods and techniques described above to return receipts for this audio communication to the originating device, such as including whether their recipients heard (or are likely to have heard) the audio communication. The originating device and/or mobile radios for recipients who did not hear this audio communication can then cooperate with the sender as described to reserve this audio communication to these recipients.

Additionally or alternatively, the sender may initiate mitigation actions for recipients who did not hear the audio communication according to these receipts (or for whom receipts were not received, such as due to inactive mobile radios). For example, the originating device (or other computing device) can access the location of a mobile radio at which this audio communication was unlikely to have been heard by its recipient; and then automatically dispatch personnel to this location to assist the recipient.

10.1 Recipient Map

In one variation shown in FIG. 5, the sender's originating device: receives an audio communication (e.g., via an integrated or connected microphone) from a sender at a first time; and transmits the audio communication—over a wireless network—to a set of mobile radios at approximately the first time, such as to a group of mobile radios selected by the sender or falling within a geospatial boundary set by the sender, such as described above. Each mobile radio in this group can then independently execute Blocks of the method S100 described above to: output the audio communication; calculate a confidence score that its user heard or comprehended the audio communication; retrieve its geospatial location; and return this confidence score, its geospatial location, and an identifier of the mobile radio or its user to the originating device. The originating device can then: render a (geo)spatial map, such as on an integrated or connected display; render icons representative of each of these mobile radios at corresponding geospatial locations on the map; and annotate (e.g., color-code) each of these icons according to the confidence score received from its corresponding mobile radio in reference to the last audio communication sent by the originating device.

For example, the originating device can: receive—from a first mobile radio in the group—a first confidence score that a first user associated with the first mobile radio heard the audio communication and a first geolocation of the first mobile radio at approximately the first time; and then display a representation of the first mobile radio—annotated with the confidence score (e.g., in the form of a color code or a caption box)—at the first geolocation on a geospatial map. The originating device can repeat this process for each other mobile radio and user in the group. For example, the originating device can: color code mobile radio icons associated with low confidence scores (below 30%) for the last audio communication in "red"; color code mobile radio icons associated with moderate confidence scores (30-80%) for the last audio communication in "yellow"; and color code mobile radio icons associated with high confidence scores (above 80%) for the last audio communication in "green."

In this variation, the originating device can then receive selection of a subset of mobile radios in the group and transmit a command—to each mobile radio in this subset—to increase its volume setting and to replay the audio communication from local memory. For example, the originating device can record mobile radio identifiers of mobile radio icons selected directly by the sender from the map and then resend this command to these mobile radios directly. In another example, the originating device can record a geospatial boundary drawn manually over the map by the sender or calculate a geospatial boundary based on waypoints placed over the map by the sender. In this example, the originating device can automatically identify a subset of mobile radios associated with confidence scores for the audio communication that fall below a threshold confidence, such as a preset threshold confidence or a threshold confidence set by the user or calculated based on a priority set by the sender for the audio communication, such as described above.

In the foregoing examples, the originating device can then automatically transmit a command—to each mobile radio in this subset of mobile radios: to increase its volume setting; and to automatically replay the audio communication stored in local memory on the mobile radio. Additionally or alternatively, in this implementation, the originating device can transmit—to each mobile radio in this subset—both: a command to increase its volume setting; and a stored copy of the audio communication, which each mobile radio can then output at increased volume according to the command. Yet alternatively, in this implementation, the originating device can: transmit—to each mobile radio in this subset—a command to increase its volume setting; prompt the sender to supply a second audio communication; and selectively transmit this second audio communication to this subset of mobile radios for output at increased volumes.

In this implementation, the originating device can also transmit a command to each mobile radio in this subset of mobile radios to preserve this elevated volume setting and to output audio communications inbound from other mobile radios in the group at this elevated volume setting (or at higher volume if selected by the corresponding user), such as until: the supervisor or other authority deactivates this group; the authority removes the mobile radio or the corresponding user from the group; or the mobile radio moves to a geospatial location outside of the geospatial boundary.

8. Onboarding New User to an Existing Group

In another variation, a user joins a "group" on the radio network, such as by activating the group or by selecting (or "jumping onto") a radio channel assigned to this group at her mobile radio; and the user's mobile radio then interfaces with other mobile radios on the radio channel to serve recent audio communications in this group to the user.

In one implementation, a remote database (or another mobile radio in the group) can store audio communications between members of the group over a period of time (e.g., the past two minutes, hour, or shift duration). When a new mobile radio joins this group, the new mobile radio can automatically: access a recent history of audio communications between members of this group from the remote database (or from the other mobile radio in the group); and replay recent audio communications in this history in order to quickly inform the user carrying the mobile radio of recent communication activity within the group.

For example, when the mobile radio joins the group, the mobile radio can access and playback: a series of the most-recent audio communications—originating at any mobile radio in the group—up to a maximum duration of one minute; a series of the most-recent audio communications—originating at a mobile radio associated with a manager or supervisor of the group—up to a maximum duration of one minute; or a selection of audio communications transmitted during the preceding thirty minutes and flagged as high-priority by the manager of the group; etc. In these examples, the remote database (or the other mobile radio) can maintain a rolling buffer of recent audio communications in this history that fulfill such time and/or priority constraints and then selectively serve the contents of this buffer to a new mobile radio upon joining the group.

In this implementation, the new mobile radio joining the group and the remote database or other mobile radio storing these audio communications can also cooperate: to confirm that the user at the new mobile radio heard these audio communication, to selectively adjust the volume at the new mobile radio, and to replay these audio communications for the new user accordingly.

9. Onboarding User to Situation

In a similar variation, mobile radios can cooperate to onboard a new user at a new mobile radio to a new situation. In particular, audio communication between mobile radios within a group can be linked to a particular time and place (i.e., a "situation"). For example, a situation can be defined by a time window, such as including a start time: concurrent with transmission of first audio communication from the mobile radio of a supervisor for this situation; or concurrent with a quorum of mobile radios joining an ad hoc group for this situation. The situation can be further defined by a location, such as defined by the supervisor for this group by drawing vertices of a geospatial boundary on a digital map rendered on a connected computing device. The situation can also be defined by a set of user IDs or mobile radio identifiers for users assigned to this situation.

A remote database (or a mobile radio associated with the supervisor of the situation) can store audio communications between members of this group during this situation. When a particular mobile radio assigned to the group but previously located outside of the geospatial boundary specified for the situation later enters this geospatial boundary while the situation is still current, the particular mobile radio can implement methods and techniques described above to: download an audio communication history for this situation from the remote database (or from the supervisor's mobile radio, etc.); automatically set its volume at an audible level (e.g., at a volume that exceeds its ambient noise level by a threshold volume difference); and then playback this audio communication history for the user carrying the particular mobile radio. For example, the particular mobile radio can playback: each audio communication in the history in chronological order; a series of the most-recent audio communications up to a maximum duration of one minute; or only audio communications flagged as high-priority by the supervisor and/or other members of the group during the situation.

The particular mobile radio can thus execute this process in order to quickly inform a user carrying the particular mobile radio of recent communication events, the current status of the situation, and the current status of other members in the group (e.g., in order to get the user "up to speed" on the situation).

Furthermore, when the situation ends, is cleared, or otherwise concludes, the remote computer system (or the supervisor's mobile radio, etc.) can discard this audio communication history, such as: when conclusion of the situation is indicated manually by the supervisor, such as through the supervisor's mobile radio or other external computing device; or when locations of all (or a large proportion, such as 90%, of) mobile radios in the group leave the geofenced area associated with the situation.

Recurring (or "fixed," "intransient") situations can be similarly defined, and mobile radios in a group assigned so a recurring situation can implement similar methods and techniques to cache audio communications between mobile radios in this group and to serve an audio communication history to a new mobile radio joining this situation. For example, a recurring situation can be defined by a geofenced boundary associated with a fixed group of users (or their mobile radios) during a recurring time window (e.g., 8 AM to 11 AM on weekdays). A mobile radio associated with this group can thus implement methods and techniques described above to automatically: access a recent history of audio communications between members of this group upon entering this geofenced area within this recurring time window; and then playback recent audio communications in this history to a user carrying this mobile radio.

10. User Volume Model

During operation, a user may manually reduce the volume setting of her mobile radio. During operation, the mobile radio can record these volume adjustment events, including mobile radio conditions and ambient conditions before, during, and/or after these volume adjustment events, such as: geospatial location; time of day; ambient noise level; ambient noise type (e.g., machine noise, human speech, white noise); proximity of a noise source (e.g., a human speaking nearby); a break schedule; frequency and/or amplitude of inbound audio communications; selected radio channel; and/or sources or originating devices of inbound audio communications; etc.

The mobile radio (or a remote computer system) can develop a model that links the volume setting at the mobile radio to these features based on these volume adjustment events and concurrent mobile radio and ambient condition data. For example, the remote computer system can implement a neural network, regression, and/or other artificial intelligence techniques to transform volume adjustment event and concurrent mobile radio and ambient condition data recorded by the mobile radio into a volume model for the user.

The mobile radio can then automatically implement this volume model to automatically adjust the volume setting on the mobile radio based on current mobile radio and ambient conditions. For example, the mobile radio can automatically increase its volume setting: when the mobile radio nears a location at which the user has historically increased the volume of the mobile radio; when the mobile radio detects an increase in ambient noise level; or at the conclusion of a scheduled break; etc. according to the volume method generated for the user.

11. Audio Communication Digest

In one variation the mobile radio can generate a digest of all heard and unheard audio communications sent to the mobile radio, such as by compiling receipts—described above—generated for each inbound audio communication received over a period of time (e.g., one hour, one day, one shift). Alternatively, an originating device can generate a digest of all recipients—designated for an audio communication—who heard and did not hear the audio communication, such as by compiling receipts received from each of these designated recipient mobile radios. Originating devices and/or mobile radios can therefore generate "histories" for audio communication comprehension at these devices and can supply these histories to senders, recipients, and/or supervisors in order to enable these entities to monitor comprehension of audio communications within this group.

12. Connected Legacy Radio

Figure 4:
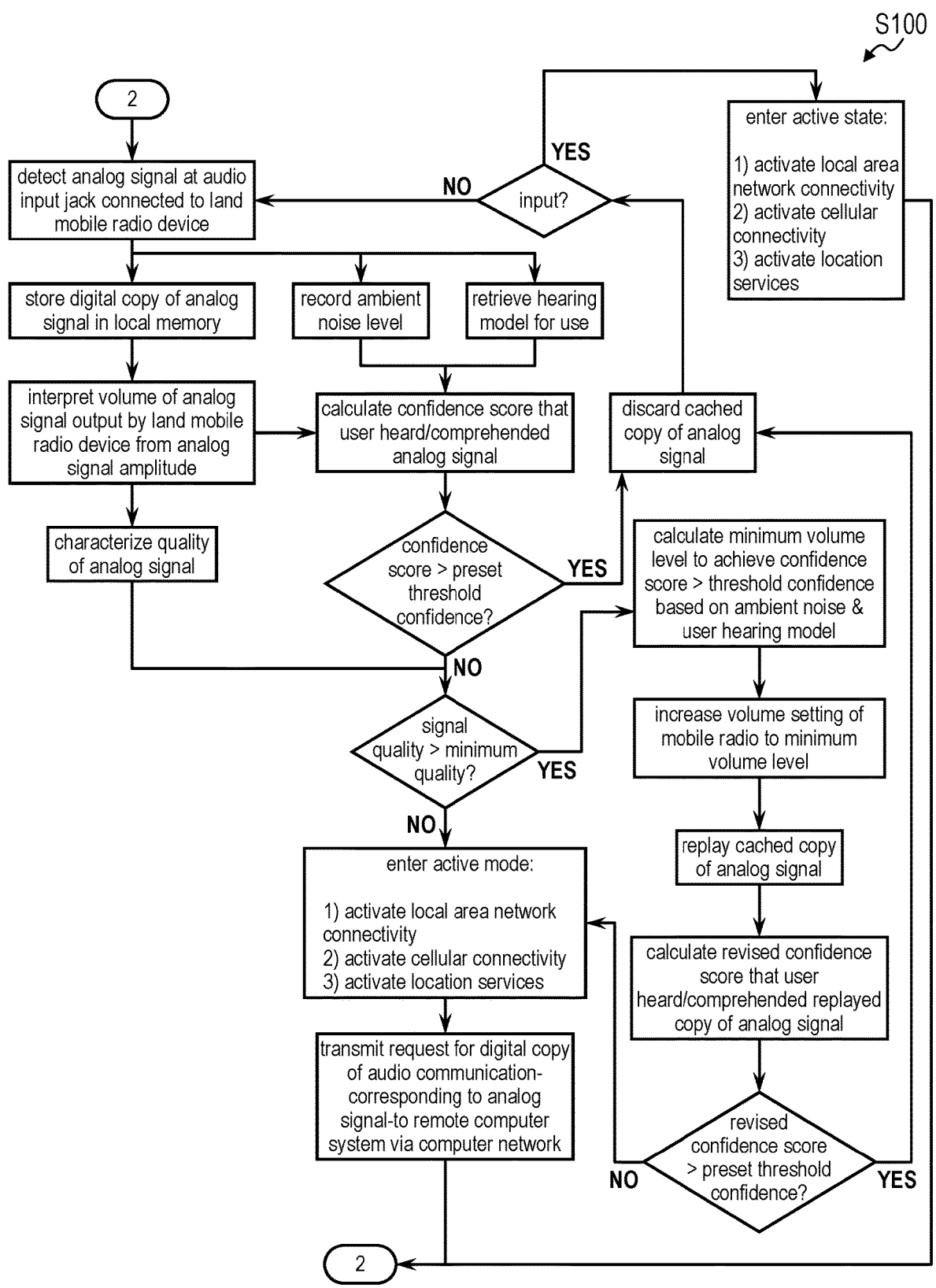
FIG. 4 is a flowchart representation of one variation of the method.

In one variation shown in FIG. 4 in which a land mobile radio (or "LMR") device is connected to the mobile radio, the mobile radio can calculate a confidence that the user heard an audio communication broadcast via a land mobile radio network (e.g., an analog legacy radio network) and received and played back by the land mobile radio device.

Generally, in this variation, the mobile radio can include: a cellular transceiver and a local area networking transceiver that support full-duplex, digital transmission of audio communications with other devices; and a geospatial position sensor configured to detect the geospatial location of the mobile radio, such as described above. The mobile radio can also be connected (e.g., with a physical connection) to a land mobile radio device configured to send and receive audio communications over half-duplex land mobile radio communication protocol. However, because the land mobile radio device may be a legacy device external to the mobile radio and without digital connectivity, remote volume controls described above may not be directly available for the land mobile radio device. Therefore, the originating device or the remote computer system—connected to the land mobile radio network—can elect whether to transmit an audio communication inbound from a sender: to the mobile radio by default, such as when the mobile radio is accessible via a computer network or digital communication protocol; or to the associated land mobile radio device, such as when the mobile radio is not accessible. When an audio communication is transmitted to the land mobile radio device via the land mobile radio network rather than to the mobile radio, the mobile radio can: implement methods and techniques similar to those described above to predict whether the user heard an audio communication output by the land mobile radio device based on data received from the land mobile radio device and other concurrent data collected by the mobile radio; and then selectively replay this audio communication accordingly.

In one implementation, a sender initiates an audio communication to a user at her originating device, which transmits this audio communication—with a specification to deliver this audio communication to the user's mobile radio—to the remote computer system, such as via a cellular or computer network. Upon receipt of this audio communication, the remote computer system transmits a query—over a cellular network or other computer network—to the user's mobile radio for the mobile radio's status. If the mobile radio returns a ping or other confirmation of its status as "active" (i.e., connected to a cellular or other computer network), the remote computer system can transmit the audio communication to this mobile radio. The mobile radio and the remote computer system can then implement methods and techniques described above to selectively adjust the volume of the mobile radio and to replay the audio communication until a confidence score that the user heard or comprehended the audio communication exceeds a threshold confidence.

Conversely, given absence of a ping or other confirmation of "active" status from the mobile radio responsive to the query, the remote computer system can determine that the mobile radio is in a "low-power" mode. More specifically, the mobile radio can disable wireless connectivity to a cellular network and other computer networks while in the low-power state in order to reduce power consumption and thus extend battery life of the mobile radio. However, in the low-power state, the mobile radio may not receive, respond to, or playback inbound communications from the remote computer system or from other devices. Therefore, the remote computer system can: elect to transmit the audio communication to the user over the land mobile radio network; convert the audio communication into an analog format; and transmit this analog audio communication to the land mobile radio device via the land mobile radio network. Upon receipt of this analog audio communication, the land mobile radio device can output this analog signal via an integrated speaker at a volume manually set by the user.

In this variation, an audio output jack of the land mobile radio device can be connected to an audio input jack on the mobile radio. Thus, the land mobile radio device can output this analog audio communication both via its integrated speaker and via its audio output jack at an amplitude corresponding to its current volume setting. In particular, the magnitude of an analog signal received by the mobile radio from the land mobile radio may be representative of the volume of the audio communication played back by the land mobile radio device. Accordingly, the mobile radio can detect an audio communication inbound to the land mobile radio device—via the land mobile radio network—responsive to receipt of an analog signal of magnitude in excess of a minimum threshold (e.g., greater than a noise floor) from the land mobile radio device.

The mobile radio can also implement methods and techniques described above to calculate a confidence that the user heard and/or comprehended the analog audio communication (or otherwise predict whether the user heard and/or comprehended the analog audio communication) thus audibly output by the land mobile radio device based on the magnitude of this analog signal, a concurrent ambient noise level, and/or a hearing model of the user, as described above. Then, if a confidence score that the user heard this analog audio communication output by the land mobile radio device is less than a preset threshold stored on the mobile radio, the mobile radio can execute a mitigation action to increase confidence that the user heard or comprehended contents of this analog audio communication.

12.1 Low-Volume Notification

In one implementation, if the confidence score that the user heard this analog audio communication is less than the preset threshold stored, the mobile radio can: output an audible, visual, and/or haptic prompt to increase a volume of the land mobile radio device; and/or output an audible, visual, and/or haptic notification indicating receipt of a recent analog audio communication via the land mobile radio device. In this implementation, the user may ignore a prompt if audio communication was heard and comprehended. Conversely, if the user did not hear this analog audio communication, the user may: manually adjust the volume setting of the land mobile radio device; manually request—via the land mobile radio device—that the sender repeat the audio communication; and/or activate the mobile radio and manually request—via the mobile radio—that the sender repeat the last audio communication.

Therefore, in this implementation, the mobile radio can transition from an active state to a low-power state, such as responsive to absence of an input from the user within a preset duration of time (e.g., 30 minutes). Later, the mobile radio can receive an analog signal from the land mobile radio device connected to the mobile radio, wherein the analog signal represents: an analog audio communication received by the land mobile radio device over an analog radio network; and a volume of the audio communication output by an audio speaker in the land mobile radio device. Accordingly, the mobile radio can: calculate a confidence score that the analog audio communication was comprehended by the user based on a magnitude of the analog signal; and then output a prompt to increase a volume setting of the land mobile radio device in response to this confidence score falling below a threshold confidence.

12.2 Digital Audio Communication Retrieval and Replay

In another implementation, if the confidence score that the user heard this analog audio communication is less than the preset threshold stored, then the mobile radio can: automatically return to the active state; and send a query to the remote computer system for a digital copy of the analog audio communication. Accordingly, the remote computer system can transmit a stored digital copy of the audio communication back to the mobile radio. The mobile radio can: calculate a minimum audio output volume predicted to yield a high confidence that the user will comprehend audio outputs from the mobile radio, such as described above; adjust its audio output volume to this minimum audio output volume; and automatically replay the digital copy of the audio communication in near real-time. In this implementation, the mobile radio can also prompt the user to increase the volume setting of the land mobile radio device, as described above, before returning to the low-power state.

In this implementation, rather than automatically replaying the digital copy of the audio communication, the mobile radio can instead: store the digital copy of the audio communication in local memory on the mobile radio; and output an audible, visual, or haptic prompt to indicate that the analog audio communication—recently inbound via the land mobile radio device—is available for replay in digital format via the mobile radio. When the user manually confirms playback of this audio communication, the mobile radio can replay this digital copy of the audio communication at the user's selected volume.

Furthermore, in the foregoing implementations, the sender may specify a priority of the audio communication prior to releasing the audio communication to the selected mobile radio(s), such as described above. Accordingly, the remote computer system can implement methods and techniques described above to interpret a minimum communication-specific confidence for user comprehension of this audio communication based on the priority value entered by the sender. Then, when the mobile radio returns to the active state and sends a query for the digital copy of the audio communication and the confidence score for comprehension of the audio communication to the remote computer system, the remote computer system can return the digital copy of the audio communication to the mobile radio with a prompt to automatically replay the audio communication at a volume that the user is likely to hear and comprehend if the confidence score for user comprehension of the audio communication is much lower than (e.g., more than 10% less than) the minimum communication-specific confidence. Similarly, the remote computer system can return the digital copy of the audio communication to the mobile radio with a prompt to replay the audio communication when manually triggered by the user if the confidence score for user comprehension of the audio communication approximates (e.g., is within 10% of) the minimum communication-specific confidence. Furthermore, the remote computer system can return confirmation of sufficient communication with the user if the confidence score for user comprehension of the audio communication exceeds the minimum communication-specific confidence.

Therefore, in this implementation, the mobile radio can transition from an active state to a low-power state, such as responsive to absence of an input from the user within a preset duration of time (e.g., 30 minutes). Later, the mobile radio can receive an analog signal from the land mobile radio device connected to the mobile radio, wherein the analog signal represents: an analog audio communication received by the land mobile radio device over an analog radio network; and a volume of the audio communication output by an audio speaker in the land mobile radio device. Accordingly, the mobile radio can calculate a confidence score that the analog audio communication was comprehended by the user based on a magnitude of the analog signal. If this confidence score falls below a threshold confidence, the mobile radio can: transition from the low-power state to the active state; transmit—via a digital radio network—a request for a digital copy of the audio communication from the remote computer system; and output the digital copy of the audio communication in response to receipt of the digital copy of the audio communication from the remote computer system, as shown in FIGS. 2 and 4.

In another implementation, if the confidence score that the user heard and/or comprehended the audio communication is less than the preset threshold stored on the mobile radio, the mobile radio can transition back to an active state to enable communications between the sender and user with remote volume controls not otherwise available through the land mobile radio device and land mobile radio network. For example, the mobile radio can: return to the active state for a preset duration of time (e.g., two minutes); and return a prediction that the user did not hear the analog audio communication back to the remote computer system via a cellular or other computer network. The remote computer system can then direct this prediction back to the sender's originating device; and the sender may then elect to manually repeat the audio communication or communicate directly with this recipient via the mobile radio—which is now active—over a cellular or other computer network rather than via the land mobile radio network.

12.3 Analog Audio Communication Capture and Replay

In another implementation, the mobile radio automatically: records the analog signal inbound from the land mobile radio device as the land mobile radio device plays back the analog audio communication; and stores a digital copy of this analog signal in local memory. During receipt of this analog signal—representing an inbound audio communication over the land mobile radio network—from the land mobile radio device, the mobile radio can also characterize a quality of the analog signal, such as based on a signal-to-noise ratio of the audio signal. Then, if the quality of the analog signal exceeds a threshold quality and if the confidence score that the user heard the analog audio communication is less than a preset threshold, the mobile radio can: output an audible, visual, or haptic prompt indicating availability of an audio communication—last inbound at the land mobile radio device—for replay by the mobile radio. The mobile radio can then replay this digital copy of the analog signal when triggered by the user. Alternatively, the mobile radio can automatically replay this digital copy of the analog signal at an elevated volume, as described above.

However, in the foregoing implementation, if the quality of the analog signal is less than the threshold quality and if the confidence that the user heard or comprehended this audio communication is less than the preset threshold, the mobile radio can execute methods and techniques described above to: transition to the active state; request and replay a higher-quality digital copy of this audio communication from the remote computer system; and/or open a digital communication channel between the originating device and the mobile radio to enable higher-quality digital communications between the sender and the user.

Therefore, in this implementation, the mobile radio can transition from an active state to a low-power state, such as responsive to absence of an input from the user within a preset duration of time (e.g., 30 minutes). Later, the mobile radio can receive an analog signal from the land mobile radio device connected to the mobile radio, wherein the analog signal represents: an analog audio communication received by the land mobile radio device over an analog radio network; and a volume of the audio communication output by an audio speaker in the land mobile radio device. Accordingly, the mobile radio can: store a representation of the analog signal in local memory; calculate a confidence score that the analog audio communication was comprehended by the user based on a magnitude of the analog signal; characterize a quality of the analog signal; and then playback the representation of the analog signal at a volume greater than the last output volume of the land mobile radio device in response to the confidence score falling below a threshold confidence and if the quality exceeds a threshold quality, as shown in FIG. 4.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising, at a mobile radio:
   receiving an audio communication from an originating device over a wireless network at a first time;
   storing the audio communication in local memory;
   outputting the audio communication, at approximately the first time, at a first volume level set manually by a user associated with the mobile radio prior to the first time;
   calculating a confidence score that the audio communication was comprehended by the user based on the first volume setting;
   accessing a priority of the audio communication defined at the originating device; and
   in response to a discrepancy between the confidence score and the priority of the audio communication, replaying the audio communication, from local memory, at a second volume setting greater than the first volume setting and overwriting the first volume in a memory of the mobile radio with the second volume setting.

2. The method of claim 1:
   further comprising characterizing a first ambient noise level proximal the mobile radio at approximately the first time;
   wherein calculating the confidence score that the audio communication was comprehended by the user comprises calculating a probability that the user heard the audio communication based on a difference between the first volume setting and the first ambient noise level;
   wherein accessing the priority of the audio communication comprises accessing the priority selected by a sender at the originating device from a pre-populated list of audio communication priorities;
   further comprising interpreting a minimum confidence for comprehension of the audio communication based on the priority of the audio communication; and
   wherein replaying the audio communication at the second volume setting comprises, in response to the confidence score that the audio communication was comprehended by the user falling below the minimum confidence for comprehension of the audio communication, replaying the audio communication, from local memory, at the second volume setting.

3. The method of claim 1:
   further comprising characterizing a first ambient noise level proximal the mobile radio at approximately the first time;
   wherein calculating the confidence score that the audio communication was comprehended by the user comprises calculating a probability that the user heard the audio communication based on a difference between the first volume setting and the first ambient noise level;
   wherein accessing the priority of the audio communication comprises accessing a time limit, selected by a sender at the originating device, for comprehension of inbound audio communications by the user at the mobile radio; and
   wherein replaying the audio communication at the second volume setting comprises:
      in response to the confidence score that the audio communication was comprehended by the user falling below a threshold confidence, initiating a timer for a duration of the time limit; and
      in response to expiration of the timer prior to manual increase of an audio output volume of the mobile radio:
         automatically increasing the audio output volume of the mobile radio to the second volume setting; and
         replaying the audio communication, from local memory, at the audio output volume.

4. The method of claim 1:
   further comprising characterizing a first ambient noise level proximal the mobile radio at approximately the first time;
   wherein calculating the confidence score that the audio communication was comprehended by the user comprises calculating a probability that the user heard the audio communication based on a difference between the first volume setting and the first ambient noise level;
wherein accessing the priority of the audio communication comprises accessing the priority, entered by a sender at the originating device, specifying urgency of the audio communication within a geospatial boundary; and
wherein replaying the audio communication at the second volume setting comprises, in response to the confidence score that the audio communication was comprehended by the user falling below a threshold confidence score and in response to a geospatial location of the mobile radio falling within the geospatial boundary, replaying the audio communication, from local memory, at the second volume setting.

5. The method of claim 4:
wherein receiving the audio communication from the originating device at the first time comprises receiving an audio communication from the originating device while the mobile radio occupies a first location outside of the geospatial boundary; and
further comprising:
  receiving a second sequence of audio communications from mobile radios in a group of mobile radios while the mobile radio occupies locations outside of the geospatial boundary;
  storing the second sequence of audio communications in local memory; and
  in response to the geospatial location of the mobile radio falling within the geospatial boundary, replaying the second sequence of audio communications, from local memory, at the second volume setting.

6. The method of claim 1, further comprising:
at an initial time preceding the first time, in response to the user adjusting an audio output volume of the mobile radio from an initial volume setting to the first volume setting less than the initial volume setting, defining a geospatial boundary around a geolocation of the mobile radio at the initial time;
tracking a geospatial location of the mobile radio; and
in response to the geospatial location of the mobile radio falling outside of the geospatial boundary at a second time succeeding the first time, automatically returning the audio output volume of the mobile radio to the initial volume setting.

7. The method of claim 1:
further comprising:
  accessing a time duration, specified by a sender at the originating device, for prioritized communications with a group of mobile radios; and
  in response to the discrepancy between the confidence score and the priority of the audio communication, setting a timer for the duration of time;
wherein accessing the priority of the audio communication comprises accessing a threshold confidence score for comprehension of audio communications transmitted from the originating device;
wherein replaying the audio communication at the second volume setting comprises, in response to the confidence score that the audio communication was comprehended by the user falling below the threshold confidence score, replaying the audio communication, from local memory, at the second volume setting; and
further comprising:
  in response to receipt of a second sequence of audio communications at the mobile radio prior to expiration of the timer, outputting the second sequence of audio communications at the second volume setting; and
  in response to expiration of the timer, returning the audio output volume of the mobile radio to the first volume setting.

8. The method of claim 1:
further comprising:
  characterizing a first ambient noise level proximal the mobile radio at approximately the first time;
  estimating a position of the mobile radio on a torso of the user based on an output of an inertial sensor integrated into the mobile radio; and
  accessing a hearing model representing hearing ability of the user; and
wherein calculating the confidence score that the audio communication was comprehended by the user comprises calculating the confidence score:
  as an inverse function of the first ambient noise level;
  as a function of the first volume setting;
  as a function of the position of the mobile radio on the torso of the user; and
  based on the hearing model.

9. The method of claim 1:
wherein receiving the audio communication from the originating device comprises, at the mobile radio, receiving the audio communication over a digital radio network while in an active state; and
further comprising, at the mobile radio:
  at a second time, transitioning from the active state to a low-power state;
  at a third time succeeding the second time, receiving an analog signal from a land mobile radio device connected to the mobile radio, the analog signal representing:
    a second audio communication received by the land mobile radio device over an analog radio network at approximately the second time; and
    a volume of the second audio communication output by an audio speaker in the land mobile radio device;
  calculating a second confidence score that the second audio communication was comprehended by the user based on a magnitude of the analog signal; and
  in response to the second confidence score falling below a threshold confidence, outputting a prompt to increase a volume setting of the land mobile radio device.

10. The method of claim 1:
wherein receiving the audio communication from the originating device comprises, at the mobile radio, receiving the audio communication over a digital radio network while in an active state;
further comprising, at the mobile radio:
  at a second time, transitioning from the active state to a low-power state, the mobile radio disconnected from the digital radio network in the low-power state;
  at a third time succeeding the second time, receiving an analog signal from a land mobile radio device connected to the mobile radio, the analog signal representing:
    a second audio communication received by the land mobile radio device over an analog radio network at approximately the second time; and a volume of the second audio communication output by an audio speaker in the land mobile radio device;

calculating a second confidence score that the second audio communication was comprehended by the user based on a magnitude of the analog signal; and in response to the second confidence score falling below a threshold confidence:
- transitioning from the low-power state to the active state;
- transmitting, via the digital radio network, a request for a digital copy of the second audio communication from a remote computer system; and
- outputting the digital copy of the second audio communication in response to receipt of the digital copy of the second audio communication.

11. The method of claim 1:

wherein receiving the audio communication from the originating device comprises, at the mobile radio, receiving the audio communication over a digital radio network while in an active state;

further comprising, at the mobile radio:
- at a second time, transitioning from the active state to a low-power state;
- at a third time succeeding the second time, receiving an analog signal from a land mobile radio device connected to the mobile radio, the analog signal representing:
  - a second audio communication received by the land mobile radio device over an analog radio network at approximately the second time; and
  - a volume of the second audio communication output by an audio speaker in the land mobile radio device;
- storing a representation of the analog signal in local memory;
- calculating a second confidence score that the second audio communication was comprehended by the user based on a magnitude of the analog signal; and
- characterizing a quality of the analog signal;
- in response to the second confidence score falling below a threshold confidence and, in response to the quality exceeding a threshold quality, outputting the representation of the analog signal at a third volume greater than the volume of the second audio communication output by the land mobile radio device.

12. The method of claim 1:

further comprising, following output of the audio communication at approximately the first time, outputting a prompt to the user to confirm comprehension of the audio communication;

wherein calculating the confidence score that the audio communication was comprehended by the user comprises calculating a low confidence score that the audio communication was comprehended by the user in response to absence of confirmation of comprehension of the audio communication within a threshold duration of time following the first time;

wherein replaying the audio communication at the second volume setting comprises replaying the audio communication at the second volume setting in response to the low confidence score according to the priority of the audio communication; and further comprising:
- receiving a second audio communication from the originating device over the wireless network at a second time;
- outputting the second audio communication at approximately the second time
- following output of the second audio communication at approximately the second time, outputting a second prompt to the user to confirm comprehension of the second audio communication; and
- transmitting confirmation of comprehension of the second audio communication to the originating device in response to receipt of confirmation of the second prompt.

13. A method comprising, at a mobile radio:

receiving an audio communication from an originating device over a wireless network at a first time;

storing the audio communication in local memory;

outputting the audio communication, at approximately the first time, at a first volume level set manually by a user associated with the mobile radio prior to the first time;

calculating a confidence score that the audio communication was comprehended by the user based on the first volume setting;

returning a first geolocation of the mobile radio at approximately the first time and the confidence score to the originating device; and based on a command from the originating device, replaying the audio communication, from local memory, at a second volume setting greater than the first volume setting at a second time succeeding the first time and overwriting the first volume in a memory of the mobile radio with the second volume setting.

14. The method of claim 13:

further comprising characterizing a first ambient noise level proximal the mobile radio at approximately the first time;

wherein calculating the confidence score that the audio communication was comprehended by the user comprises:
- estimating a minimum volume setting for comprehension of the audio communication by the user based on the first ambient noise level; and
- calculating the confidence score based on a difference between the first volume setting and the minimum volume setting; and wherein replaying the audio communication at the second volume setting comprises replaying the audio communication at the second volume setting, greater than the first volume setting, in response to the confidence score falling below a threshold score assigned to a geospatial location containing the first geolocation of the mobile radio at approximately the first time.

15. The method of claim 13:

further comprising
- in response to the confidence score falling below a threshold confidence score, enabling remote adjustment of an output volume of the mobile radio at the originating device; and
- receiving the command specifying second volume setting, the second volume setting set by a sender at the originating device; and wherein replaying the audio communication at the second volume setting at the second time comprises replaying the audio communication at the second volume setting at the second time in response to receipt of the command.

16. The method of claim 13:

further comprising at the originating device, defining a group of users comprising the user, each user in the group of users associated with a mobile radio in a set of mobile radios;

transmitting the audio communication to the set of mobile radios at approximately the first time;

aggregating a set of geospatial locations and a set of confidence scores, for comprehension of the audio communication by users in the group of users, received from the set of mobile radios at approximately the first time;

populating a spatial map with geospatial locations of mobile radios in the set of mobile radios at approximately the first time;

annotating geospatial locations of mobile radios in the set of mobile radios at approximately the first time with confidence scores that corresponding users, in the set of users, comprehended the audio communication;

at the originating device, rendering the spatial map;

receiving a selection of a subset of mobile radios from the spatial map, the subset of mobile radios comprising the mobile radio; and transmitting the command to replay a last audio communication at increased volume to each mobile radio in the subset of mobile radios; and wherein replaying the audio communication at the second volume setting at the second time comprises, at the mobile radio, replaying the audio communication, from local memory, at the second volume setting in response to receipt of the command.

17. A method comprising:

at an originating device, receiving an audio communication from a sender at a first time;

transmitting the audio communication, over a wireless network, to a set of mobile radios at approximately the first time, each mobile radio in the set of mobile radios associated with a user in a group of users;

receiving, from a first mobile radio in the set of mobile radios, a first confidence score that a first user associated with the first mobile radio heard the audio communication and a first geolocation of the first mobile radio at approximately the first time;

displaying, at the originating device, a representation of the first mobile radio, annotated with the confidence score, at the first geolocation on a spatial map;

at a second time succeeding the first time, receiving selection of a subset of mobile radios, in the set of mobile radios; and transmitting a command, to each mobile radio in the subset of mobile radios, to increase a volume setting of the mobile radio and overwriting a first volume in a memory of the mobile radio with a second volume setting.

18. The method of claim 17:

wherein receiving selection of the subset of mobile radios, in the set of mobile radios comprises:
  receiving a boundary drawn manually over the spatial map by the sender; and
  identifying the subset of mobile radios associated with confidence scores, less than a threshold confidence, that corresponding users heard the audio communication; and wherein transmitting the command to each mobile radio in the subset of mobile radios comprises transmitting the command, to each mobile radio in the subset of mobile radios:
  to increase the volume setting of the mobile radio; and
  to automatically replay the audio communication stored in local memory on the mobile radio.

19. The method of claim 17:

further comprising receiving selection of the group of users at the originating device at an initial time preceding the first time; and wherein transmitting the command, to each mobile radio in the subset of mobile radios, to increase the volume setting of the mobile radio comprises transmitting the command, to each mobile radio in the subset of mobile radios, to increase the volume setting of the mobile radio for audio communications between mobile radios in the set of mobile radios while the group of users is indicated as active by the sender.

20. The method of claim 17, further comprising:

at a remote database, storing the audio communication in association with the group of users; and in response to a new user joining the group of users:
  transmitting the audio communication, from the remote database, to a second mobile radio associated with the new user;
  receiving, from the second mobile radio, a second confidence score that the new user heard the audio communication; and
  in response to the second confidence score falling below a threshold confidence score, transmitting a command to the second mobile radio to replay the audio communication at an increased output volume.

* * * * *